United States Patent [19]
Hashimoto

[11] Patent Number: 6,058,222
[45] Date of Patent: *May 2, 2000

[54] IMAGE-PROCESSING RASTER AND SERIAL-FORMAT IMAGE DATA

[75] Inventor: Yasunori Hashimoto, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/414,055

[22] Filed: Mar. 30, 1995

Related U.S. Application Data

[63] Continuation of application No. 08/005,464, Jan. 19, 1993, abandoned.

[30] Foreign Application Priority Data

Jan. 21, 1992 [JP] Japan ................................ 4-008150
Jan. 21, 1992 [JP] Japan ................................ 4-008151

[51] Int. Cl.[7] ...................................................... H04N 1/41
[52] U.S. Cl. ............................................ 382/300; 358/428
[58] Field of Search .................................. 358/448, 445, 358/443, 451, 452, 467, 428, 140; 395/139; 382/47, 300, 299

[56] References Cited

U.S. PATENT DOCUMENTS

| | | | |
|---|---|---|---|
| 4,722,064 | 1/1988 | Suzuki | 395/114 |
| 5,243,440 | 9/1993 | Hashimoto | 358/448 |
| 5,303,068 | 4/1994 | Udagawa et al. | 358/444 |
| 5,875,268 | 2/1999 | Miyake | 382/276 |

FOREIGN PATENT DOCUMENTS 5-24259 2/1993 Japan ............................ B41J 2/485

*Primary Examiner*—Jerome Grant, II
*Attorney, Agent, or Firm*—Fitzpatrick, Cella, Harper & Scinto

[57] ABSTRACT

Serial-format image data inputted from a scanner is subjected to scaling processing based upon linear interpolation performed by a linear-interpolation processor. Since the scaling processing is applied to serial-format image data, a line buffer that stores one line of pixels necessitated by the method of linear interpolation need only have a capacity of one main scanning line in the serial format. One main scanning line in the serial format corresponds to the number of elements arrayed in the reading head of a scanner and is sufficiently small in comparison with one line of capacity in a raster format. Image data thus subjected to scaling processing is converted into the raster format by a vertical-horizontal conversion processor and the resulting data is stored in an image memory. Image data read out of the image memory also is subjected to scaling processing after being converted into the serial format. Furthermore, at the time of scaling processing, it is determined where a character has been superimposed upon the image data. If an area is occupied by a character, then scaling processing is performed by a simple iterative method. Otherwise, scaling processing is carried out by linear interpolation. This makes it possible to record sharp characters.

57 Claims, 33 Drawing Sheets

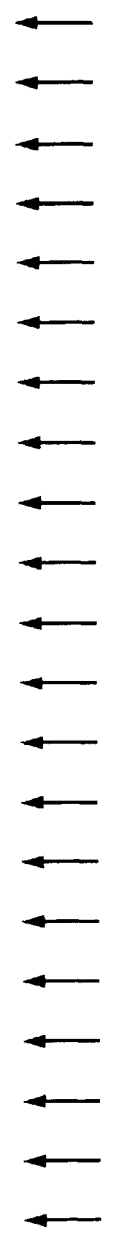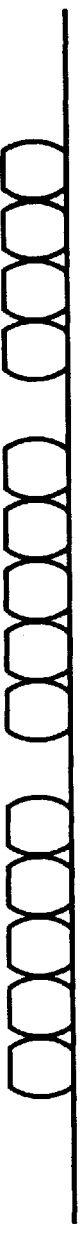
FIG. 3A SHUTTLE SYNCHRONIZING SIGNAL
FIG. 3B LINE SYNCHRONIZING SIGNAL
FIG. 3C IMAGE SYNCHRONIZING CLOCK
FIG. 3D IMAGE SIGNAL

FIG. 12A SHUTTLE SYNCHRONIZING SIGNAL
FIG. 12B LINE-REQUEST SIGNAL
FIG. 12C LINE SYNCHRONIZING SIGNAL
FIG. 12D IMAGE-REQUEST CLOCK
FIG. 12E IMAGE CLOCK
FIG. 12F IMAGE SIGNAL

| ADDRESS | DATA |
|---|---|
| 0 0 0 0 0 H | (1, 1) |
| 0 0 0 0 1 H | (2, 1) |
| ⋮ | ⋮ |
| 0 0 0 F F H | (256, 1) |
| 0 0 1 0 0 H | (1, 2) |
| ⋮ | ⋮ |
| 0 0 1 F F H | (256, 2) |
| 0 0 2 0 0 H | (1, 3) |
| ⋮ | ⋮ |
| F F E F F H | (256, 4095) |
| F F F 0 0 H | (1, 4096) |
| ⋮ | ⋮ |
| F F F F F H | (256, 4096) |

FIG. 20

| ADDRESS | DATA |
|---|---|
| 0 0 0 0 0 H | (1, 1) |
| 0 0 0 0 1 H | (1, 2) |
| ⋮ | ⋮ |
| 0 0 F F F H | (1, 4096) |
| 0 1 0 0 0 H | (2, 1) |
| 0 1 0 0 1 H | (2, 2) |
| ⋮ | ⋮ |
| 0 1 F F F H | (2, 4096) |
| F F 0 0 0 H | (256, 1) |
| ⋮ | ⋮ |
| F F F F F H | (256, 4096) |

FIG. 26

| 00 | 00 | 00 | 00 | 00 | 00 | 00 | 00 | 00 | 00 |
|----|----|----|----|----|----|----|----|----|----|
| 00 | 00 | 00 | 40 | 80 | 40 | 00 | 00 | 00 | 00 |
| 00 | 00 | 00 | 80 | FF | 80 | 00 | 00 | 00 | 00 |
| 00 | 40 | 80 | C0 | FF | 80 | 00 | 00 | 00 | 00 |
| 00 | 80 | FF | FF | FF | 80 | 00 | 00 | 00 | 00 |
| 00 | 40 | 80 | C0 | FF | 80 | 00 | 00 | 00 | 00 |
| 00 | 00 | 00 | 80 | FF | 80 | 00 | 00 | 00 | 00 |
| 00 | 00 | 00 | 80 | FF | 80 | 00 | 00 | 00 | 00 |
| 00 | 00 | 00 | 80 | FF | 80 | 00 | 00 | 00 | 00 |
| 00 | 00 | 00 | 80 | FF | 80 | 00 | 00 | 00 | 00 |
| 00 | 00 | 00 | 80 | FF | 80 | 00 | 00 | 00 | 00 |
| 00 | 40 | 80 | C0 | FF | C0 | 80 | 40 | 00 | 00 |
| 00 | 80 | FF | FF | FF | FF | FF | 80 | 00 | 00 |
| 00 | 40 | 80 | 80 | 80 | 80 | 80 | 40 | 00 | 00 |
| 00 | 00 | 00 | 00 | 00 | 00 | 00 | 00 | 00 | 00 |
| 00 | 00 | 00 | 00 | 00 | 00 | 00 | 00 | 00 | 00 |

FIG. 27

| 00 | 00 | 00 | 00 | 00 | 00 | 00 | 00 | 00 | 00 |
|----|----|----|----|----|----|----|----|----|----|
| 00 | 00 | 00 | 00 | 00 | 00 | 00 | 00 | 00 | 00 |
| 00 | 00 | 00 | 00 | FF | FF | 00 | 00 | 00 | 00 |
| 00 | 00 | 00 | 00 | FF | FF | 00 | 00 | 00 | 00 |
| 00 | 00 | FF | FF | FF | FF | 00 | 00 | 00 | 00 |
| 00 | 00 | FF | FF | FF | FF | 00 | 00 | 00 | 00 |
| 00 | 00 | 00 | 00 | FF | FF | 00 | 00 | 00 | 00 |
| 00 | 00 | 00 | 00 | FF | FF | 00 | 00 | 00 | 00 |
| 00 | 00 | 00 | 00 | FF | FF | 00 | 00 | 00 | 00 |
| 00 | 00 | 00 | 00 | FF | FF | 00 | 00 | 00 | 00 |
| 00 | 00 | 00 | 00 | FF | FF | 00 | 00 | 00 | 00 |
| 00 | 00 | 00 | 00 | FF | FF | 00 | 00 | 00 | 00 |
| 00 | 00 | FF | FF | FF | FF | FF | FF | 00 | 00 |
| 00 | 00 | FF | FF | FF | FF | FF | FF | 00 | 00 |
| 00 | 00 | 00 | 00 | 00 | 00 | 00 | 00 | 00 | 00 |
| 00 | 00 | 00 | 00 | 00 | 00 | 00 | 00 | 00 | 00 |

FIG. 30

| RESOLUTION OF INPUT IMAGE | FONT SIZE |
|---|---|
| 400DPI × 400DPI | 48 × 48 |
| 300DPI × 300DPI | 32 × 32 |
| 200DPI × 200DPI | 24 × 24 |
| 100DPI × 100DPI | 12 × 12 |

IMAGE-PROCESSING RASTER AND SERIAL-FORMAT IMAGE DATA

This application is a continuation of application Ser. No. 08/005,464, filed Jan. 19, 1993, now abandoned.

BACKGROUND OF THE INVENTION

1. Field of the Invention

This invention relates to an image processing method for inputting, outputting and storing image information, as well as to an apparatus for practicing this method.

2. Description of the Prior Art

In a conventional image processing apparatus for inputting and outputting data in serial fashion and storing the data in a raster format, image information having a format read in serial fashion (which information shall be referred to as a serial format hereinafter; what is meant by "serial fashion" or "serial format" is illustrated in FIG. 16: scanning is done along several raster lines simultaneously, and the data from the scanner is taken for one column across the multi-raster-line strip or band 1902, then for the next such column, etc., across the width of the paper) is converted into a raster format, after which scaling processing is performed to store the information in memory. At readout, the raster-format image information that has been stored in memory is read out and subjected to scaling processing, after which the information is converted into the serial format and the resulting data is outputted as by printing.

When data having a format in which code data has been inserted into raster-format image data is outputted in a serial format, the image data is converted from the raster format to the serial format, after which an image corresponding to the code data is generated and imbedded in the image data. The image data thus obtained is outputted in serial fashion.

SUMMARY OF THE INVENTION

However, in order to apply scaling processing to the raster-format image in the prior art, the capacity of an image-data buffer for scaling processing is required to be enough to handle the pixels involved in a single main scan in raster scanning.

Further, after the image data has been converted from the raster format to the serial format, processing for adding the image information corresponding to the code data is complicated. More specifically, code data added on to the raster-format image data is accompanied by address information indicating where the data is to be placed. This address information is given in the form of dot columns and rows in the image. In a case where an image (referred to as a "character") corresponding to code data is obtained from the code data and the character is developed, in conformity with the serial method, in image data provided with addresses, it is not enough merely to slice the character every dot row and superimpose it upon the image data in memory, as in the case of the raster format. There are instances in which a generated character is not entirely contained in the area (referred to as a "band") produced by a single serial scan but extends across a plurality of bands. In consideration of such cases, it is necessary to correctly assign addresses to the dots that make up the character and then develop the dots in memory.

Accordingly, an object of the present invention is to provide an image processing apparatus in which the storage capacity required of an image data buffer used for the purpose of scaling processing is reduced.

Another object of the present invention is to provide an image processing apparatus in which image data is generated, through simple processing, from data having a format in which code data has been inserted into raster-format image data, and the generated image data is outputted in serial fashion.

According to the present invention, an image processing apparatus that attains the foregoing objects comprises scaling means for applying scaling processing to serial-format image data, converting means for converting the serial-format image data into raster-format image data, and storing means for storing the raster-format image data.

In another aspect of the invention, the image processing apparatus comprises storing means for storing raster-format image data, converting means for converting the raster-format image data into serial-format image data, and scaling means for applying scaling processing to the serial-format image data.

In another aspect of the invention, the image processing apparatus comprises input means for inputting serial-format image data, first scaling means for applying scaling processing to the serial-format image data inputted by the input means, first converting means for converting the serial-format image data into raster-format image data, storing means for storing the raster-format image data, second converting means for converting the raster-format image data into serial-format image data, and second scaling means for applying scaling processing to the serial-format image data obtained as an output from the second converting means.

According to another aspect of the present invention, there is provided an image processing apparatus for processing image data accompanied by code data, comprising synthesizing means for generating a character image that corresponds to the code data and combining the character image with raster image data, converting means for converting the raster image data into serial-format image data, and scaling means for applying scaling processing to the serial-format image data.

According to another aspect of the present invention, there is provided an image processing apparatus for processing raster image data accompanied by code data, comprising synthesizing means for generating a character image that corresponds to the code data and combining the character image with the raster image data, converting means for converting the raster image data obtained by the synthesizing means into serial-format image data, scaling means for scaling the image data, which has been converted into the serial-format image data by the converting means, in such a manner that the character image is scaled by a simple iterative method while other portions are scaled by linear interpolation, and serial output means for printing out the image data scaled by the scaling means.

According to the present invention, an image processing method that attains the foregoing objects comprises a scaling step of applying scaling processing to serial-format image data, a converting step of converting the serial-format image data into raster-format image data, and a storing step of storing the raster-format image data.

In another aspect of the invention, the image processing method comprises a storing step of storing raster-format image data, a converting step of converting the raster-format image data into serial-format image data, and a scaling step of applying scaling processing to the serial-format image data.

According to another aspect of the present invention, there is provided an image processing method for processing image data accompanied by code data, comprising a synthesizing step of generating a character image that corresponds to the code data and combining the character image with raster image data, a converting step of converting the raster image data into serial-format image data, and a scaling step of applying scaling processing to the serial-format image data.

By virtue of the arrangements described above, image data read in according to a serial format is subjected to scaling processing in the same format and the image data resulting from the scaling processing is converted vertically and horizontally.

Further, a character image generated from code data is combined with raster-format image data and scaling processing is executed after the resulting image is converted into a format corresponding to a serial system.

Thus, as described above, the image processing apparatus of the invention is advantageous in that it is possible to reduce the storage capacity required of an image data buffer used for the purpose of scaling processing.

Further, it is possible to generate image data, through simple processing, from data having a format in which code data has been inserted into raster-format image data, and output the generated image data in serial fashion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention as, together with the description, serve to explain the principles of the invention.

FIGS. 3A–3D are a timing chart of an image signal dealt with in the apparatus of the embodiment of FIG. 1;

FIGS. 12A–12F are a signal timing chart of signals between the image supply source and the linear-interpolation processor;

FIG. 17 is a diagram illustrating memory mapping in a vertical-horizontal conversion processor;

FIG. 19 is a diagram illustrating memory mapping in a vertical-horizontal conversion processor;

FIG. 20 is a diagram illustrating memory mapping in a vertical-horizontal conversion processor;

FIG. 26 shows an example of a character enlarged by linear interpolation;

FIG. 27 shows an example of a character enlarged by simple iteration;

FIG. 30 is a diagram showing the relationship between the resolution of an input image and font size;

DESCRIPTION OF THE PREFERRED EMBODIMENTS

First Embodiment

Figure 13:
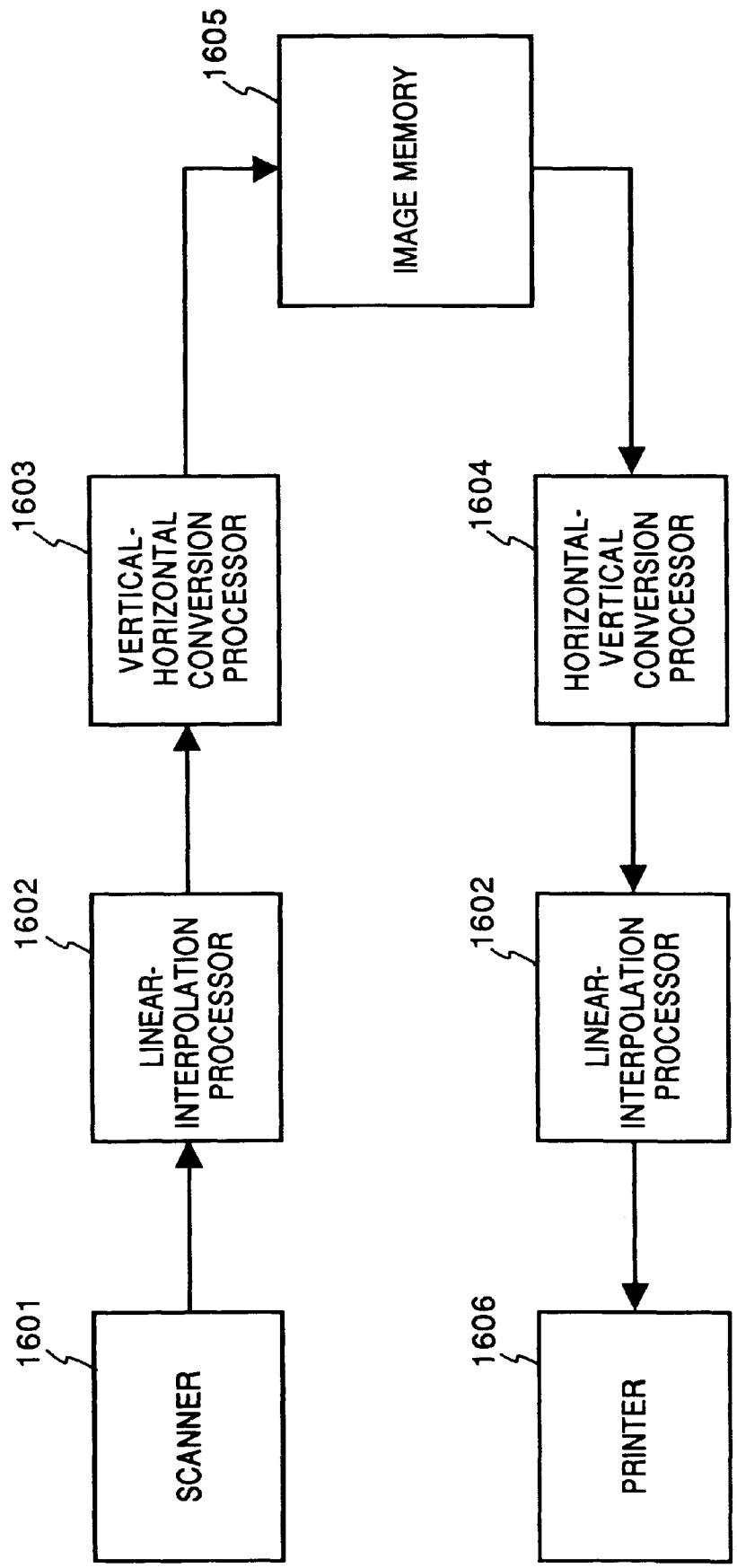
FIG. 13 is a block diagram showing an image processing apparatus according to an embodiment of the present invention.

FIG. 13 is a block diagram of an image processing apparatus that best illustrates the present invention. The apparatus includes a scanner 1601 for reading an image in serial fashion, a linear-interpolation processor 1602 which applies scaling processing to the read image data by a method of linear interpolation, a vertical-horizontal conversion processor 1603 for converting the serially read image into a raster-format image, a horizontal-vertical conversion processor 1604 for converting raster-format image data into serial-format image data capable of being outputted serially, an image memory device 1605 for storing the raster-format image data, and a serial printer 1606 for recording an image in serial fashion.

The serial format will be described first with reference to FIG. 16. A head 1901 is a reading head in case of a scanner and a recording head in case of a printer. An element 1902 is a reading element such as a CCD in case of a scanner and a recording nozzle or recording head in case of a printer. An area 1903 is an area scanned a first time, and an area 1904 is an area scanned a second time. One page of an image is painted on a paper 1905.

Figure 16:
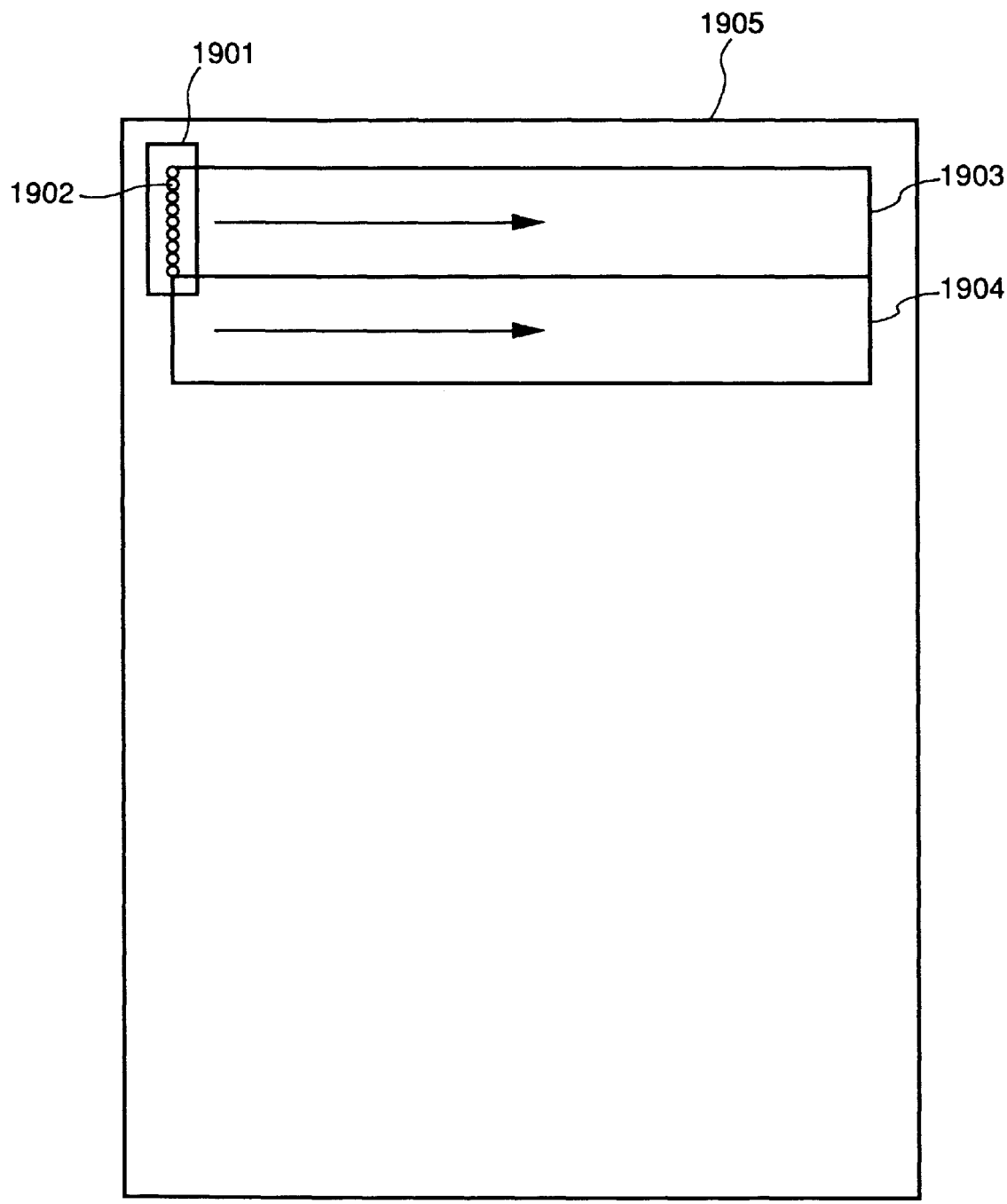
FIG. 16 is a diagram illustrating a serial format.

The term "serial method", as used in this specification and claims, means reading or recording one page by performing scanning a plurality of times at a predetermined width each time, as illustrated in FIG. 16. Hereinafter this predetermined width shall be referred to as a "shuttle width", a scan performed over the shuttle width shall be referred to as a "shuttle scan", and the area scanned by a single shuttle scan shall be referred to as a "band". A serial format refers to a format in which, when an image has been read in serially, items of pixel data the number whereof is equivalent to the number of reading heads are arrayed serially in the direction of the reading heads and this is repeated in the direction of the shuttle scan.

In the vertical-horizontal conversion processor 1603 on the reading side in the image processing apparatus of this embodiment as shown in FIG. 13, image data read in by the scanner 1601 and subjected to scaling processing by the linear-interpolation processor 1602 is converted from the serial format to the raster format and the resulting raster-format data is stored in the image memory 1605. Conversely, at the time of recording, the image data in the image memory 1605 is subjected to horizontal-vertical conversion to be put into the serial format, this data is subjected to scaling processing and the result is outputted from the printer 1606.

Scaling processing in accordance with a method of linear interpolation will now be described in detail with reference to the drawings.

Description of Linear Interpolation

Since the serial format is described in this embodiment, the main scanning direction in the raster format will be the shuttle scanning direction, and the subordinate scanning direction will be the direction of the shuttle width. In the description of the embodiment that follows, use will be made of the terms "shuttle scanning direction" and "band-width direction". In the linear-interpolation processing described below, the treatment of the vertical and the horizontal in an image in the raster format is the reverse of that in the serial format in order to carry out processing by treating one band (data in an amount equivalent to one shuttle scan) in the serial-format data in the same manner as one page in the raster format. Further, in the description that follows, a line refers to a row of pixels in the main scanning direction, i.e., one row of pixels constituting the shuttle band in the serial method.

Figure 1:
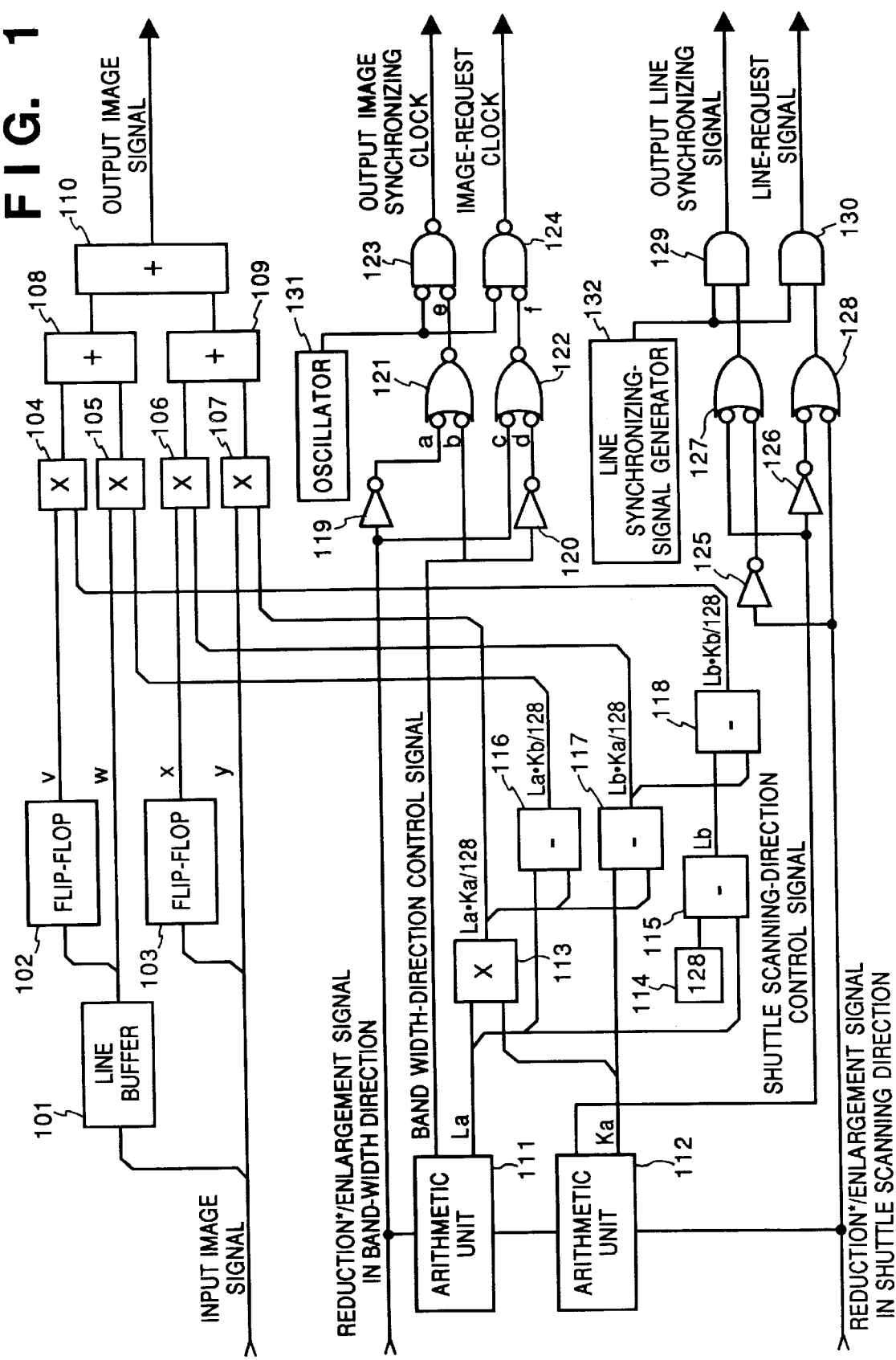
FIG. 1 is a block diagram showing the construction of a linear-interpolation processor according to an embodiment of the present invention.

FIG. 1 is a block diagram illustrating the construction of a linear-interpolation processor according to an embodiment of the present invention. In FIG. 1, an input image signal is delayed by one line in a line buffer 101 and is delayed by one pixel using flip-flops 102, 103. An oscillator 131 generates an image clock, and a line synchronizing signal generator 132 generates a line synchronizing signal.

The linear-interpolation processing further includes multipliers 104~107, 113, adders 108~110, an arithmetic unit 111 for calculating the length of a side in the band-width direction, an arithmetic unit 112 for calculating the length of a side in the shuttle scanning direction, a block 114 for outputting fixed value (128 in this embodiment), subtractors 115~118, inverters 119, 120, 125, 126, AND gates 121, 122, 129, 130, OR gates 123, 124 and NAND gates 127, 128. These components perform predetermined operations described below.

Figure 2:
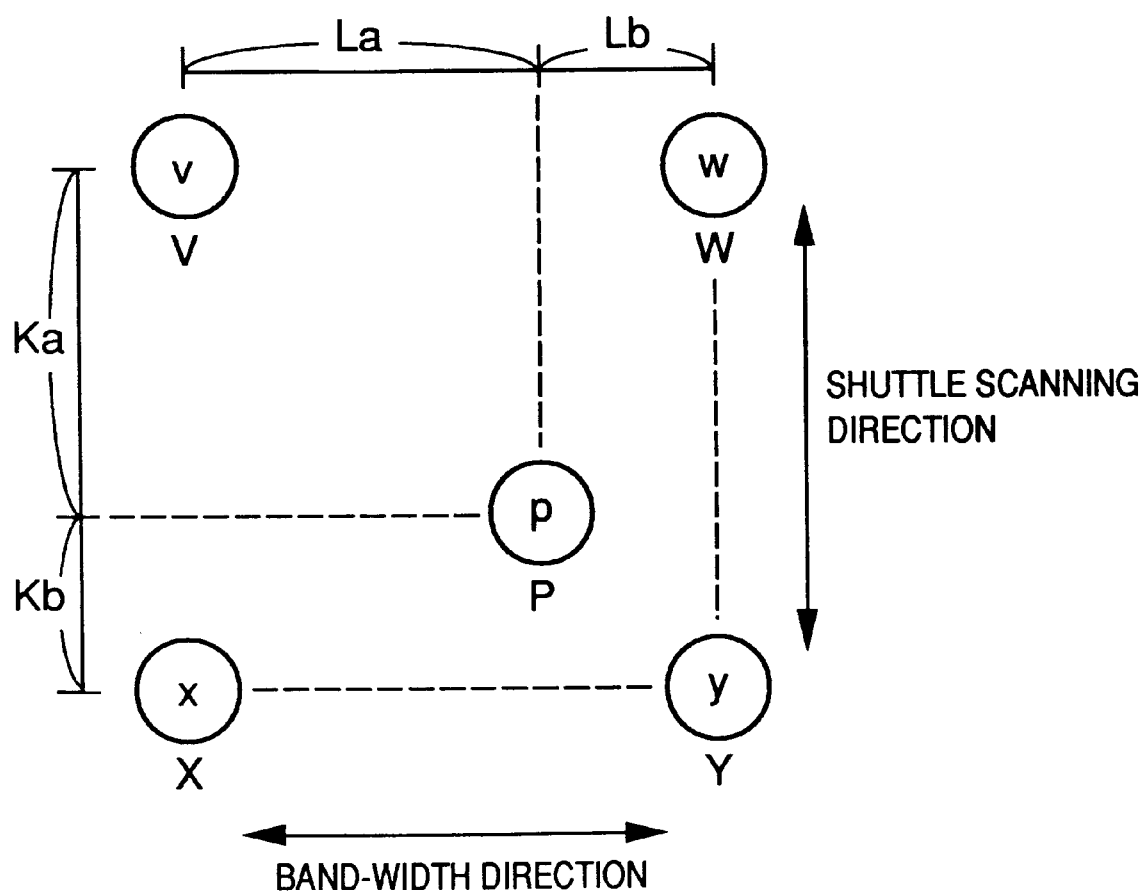
FIG. 2 is a diagram showing the relationship between points before conversion and points after conversion in a method of linear interpolation.

FIG. 2 is a diagram showing the relationship between points before conversion and points after conversion in a method of linear interpolation. In FIG. 2, points V, W, X, Y represent points before conversion, and the levels of brightness of these points are denoted by v, w, x, y, respectively.

Let a point P represent a point after conversion. With regard to the band-width direction, let the point P be at a position having a distance La from the point V and a distance Lb from the point W. With regard to the shuttle scanning direction (the up-down direction in FIG. 2), let the point P be at a position having a distance Ka from the point V and a distance Kb from the point X. In this embodiment, the length of one side before conversion is considered to be 128, and therefore the relations La+Lb=128, Ka+Kb=128 hold Accordingly, the brightness level p of the point P in FIG. 2 is expressed by the following:

(v·Lb·Kb+w·La·Kb+x·Lb·Ka+y·La·Ka)/[(La+Lb)·(Ka+Kb)]

FIGS. 3A–3D are a timing chart of an image signal dealt with in this apparatus. In FIGS. 3A–3D, a shuttle synchronizing signal is a high-active signal which takes on a high logic level during the time that an image signal of one band is effective. A line synchronizing signal is a high-active signal which takes on a high logic level during the time that an image signal of one band is effective. An image synchronizing clock is a clock outputted in single-pixel units. The image signal is outputted in synchronization with the leading edge of the clock signal. It should be noted that the image signal is multivalued data composed of eight bits per pixel.

Figure 11:
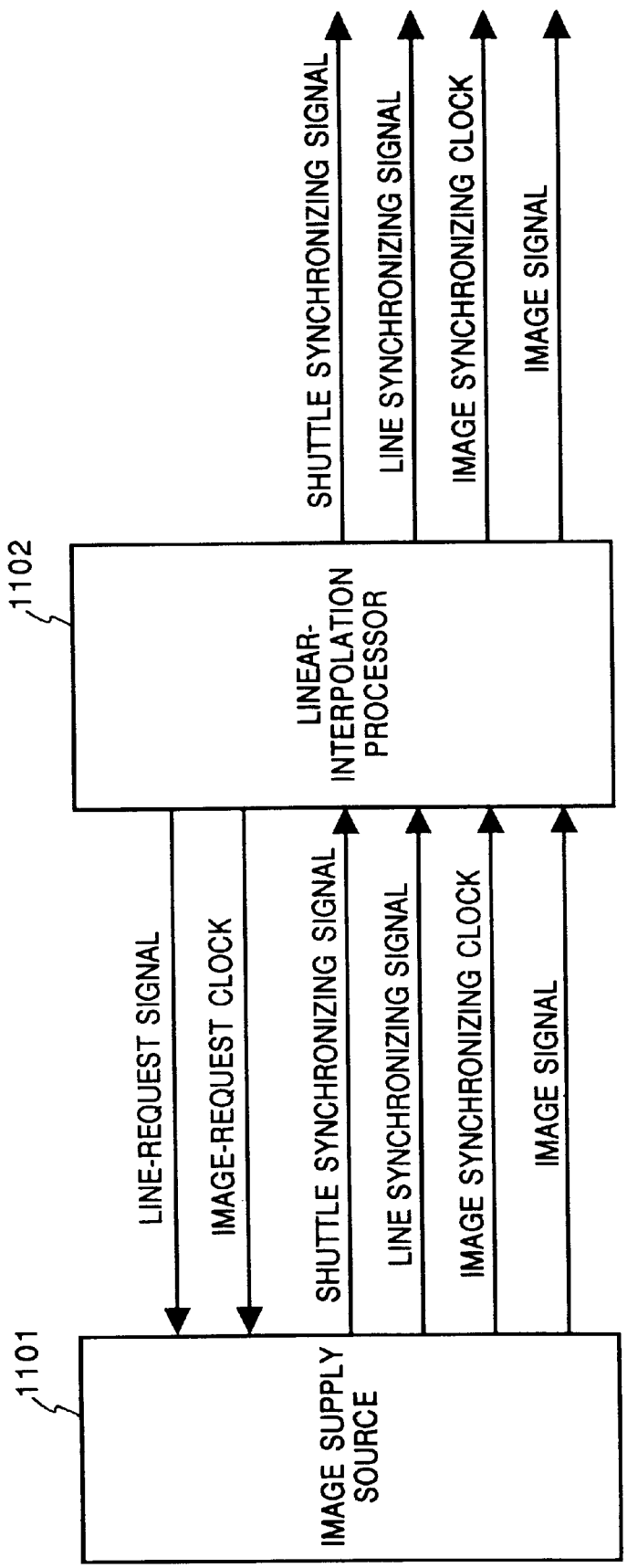
FIG. 11 is a block diagram showing the relationship between a linear-interpolation processor and an image supply source according to the embodiment.

FIG. 11 is a block diagram showing the relationship between the linear-interpolation processor and an image supply source according to the embodiment, and FIG. 12 is a signal timing chart of signals associated with the image supply source and the linear-interpolation processor.

In FIG. 11, signals outputted by a image supply source 1101 are the same as the image signals shown in FIG. 3. A linear-interpolation processor 1102 outputs a line-request signal and an image-request signal to the image supply source 1101. As shown in FIG. 12, the image supply source outputs an image signal when the line synchronizing signal is inputted to the image supply source from the linear-interpolation processor. Further, the image supply source updates the image signal when the image-request clock is inputted thereto. In other words, it is possible to enrich the supply of the image by controlling the line-request signal and the image-request signal.

Description of Computation Method for Brightness Level

A method of calculating brightness level in the apparatus of this embodiment will now be described.

The input of the image signal is performed in line units, as shown in FIGS. 3A–3D, and the input is delayed by one line in the line buffer 101 shown in FIG. 1. Let v represent the image data obtained by applying a one-pixel delay to the one-line delayed signal using the flip-flop 102, and let w represent the image data that is the one-line delayed signal obtained without passing through the flip-flop 102. Let x represent image data obtained by applying a one-pixel delay to the input image signal, which has not been delayed by one line, using the flip-flop 103, and let w represent the image data that is the input image signal obtained without passing through the flip-flop 103. Thus, four reference points needed for processing in accordance with the linear interpolation method can be referred to at the same time.

The arithmetic unit 111 in FIG. 1 for calculating the length of a side in the band-width direction has a function for outputting a band-width direction control signal and a function for calculating and outputting the aforementioned La. The band-width direction control signal is a signal for thinning out the image synchronizing clock pulses in a case where reduction is performed in the band-width direction, and a signal for thinning out the image-request clock signal pulses outputted to the supply source of the image signal in a case where enlargement is performed in the band-width direction.

The arithmetic unit 112 for calculating the length of a side in the shuttle scanning direction has a function for outputting a shuttle scanning-direction control signal and a function for calculating and outputting the aforementioned Ka. The shuttle scanning-direction control signal is a signal for thinning out the line synchronizing signal pulses in a case where reduction is performed in the shuttle scanning direction, and a signal for thinning out the image-request signal pulses outputted to the supply source of the image signal in a case where enlargement is performed in the shuttle scanning direction.

The aforementioned La and Ka both have a minimum value of 0 and a maximum value of 80H (where H indicates a hexadecimal number). With regard to the number of internal arithmetic bits, all processing is executed in eight bits.

In calculation of brightness level, it is necessary to find La·Ka/128, La·Kb/128, Lb·Ka/128 and Lb·Kb/128 from La outputted by the arithmetic unit 111 and Ka outputted by the arithmetic unit 112. The reason for dividing by 128 throughout is as follows: Since the maximum value of the length of the side is 80H, 4000H is the result when the maximum values are multiplied together, and the portion from the 15th bit to the eighth bit from the lower order bits is valid.

The multiplier 113 multiplies La, which is outputted by the arithmetic unit 111, by Ka, which is outputted by the arithmetic unit 112, and outputs bits from the 15th bit of lower order to the eighth bit. This value is La·Ka/128. The subtractor 116 subtracts La·Ka/128 from La, whereby La·Kb/128 is obtained. This is because La=La·(Ka+Kb)/128 holds.

Similarly, the subtractor 117 subtracts La·Ka/128 from Ka, whereby Lb·Kb/128 is obtained, and La is subtracted from 128 by the subtractor 115, whereby Lb is obtained. Further, the subtractor 118 subtracts Lb·Ka/128 from Lb, which is the output of the subtractor 115, whereby Lb·Kb/128 is obtained.

The multiplier 104 multiplies the aforementioned v by Lb·Kb/128 and outputs bits from the 15th bit of lower order to the eighth bit. This value is v·Lb·Kb/16384. The multiplier 105 multiplies w by La·Kb/128 and outputs bits from the 15th bit of lower order to the eighth bit. This value is w·La·Kb/16384. The multiplier 106 multiplies x by Lb·Ka/128 and outputs bits from the 15th bit of lower order to the eighth bit. This value is x·La·Ka/16384. The multiplier 107 multiplies y by La·Ka/128 and outputs bits from the 15th bit of lower order to the eighth bit. This value is y·La·Ka/16384.

The adder 108 adds the output of multiplier 104 and the output of multiplier 105 and outputs bits from the ninth bit of lower order to the second bit. This value is (v·Lb·Kb+ w·La·Kb)/32768. The adder 109 adds the output of multiplier 106 and the output of multiplier 107 and outputs bits from the ninth bit of lower order to the second bit. This value is (x·Lb·Ka+y·La·Ka)/32768. The adder 110 adds the output of multiplier 108 and the output of multiplier 109 and outputs bits from the ninth bit of lower order to the second bit. This value is brightness level p of point P, namely (V·Lb·Lb+w·La·Kb+x·Lb·Ka+y·La·Ka)/65536.

Description of Synchronizing-Signal Control Method

Next, a method of controlling the synchronizing signals will be described by dividing the operation into those for reduction, enlargement and 1/1 scaling and using concrete numerical values.

Figure 4:
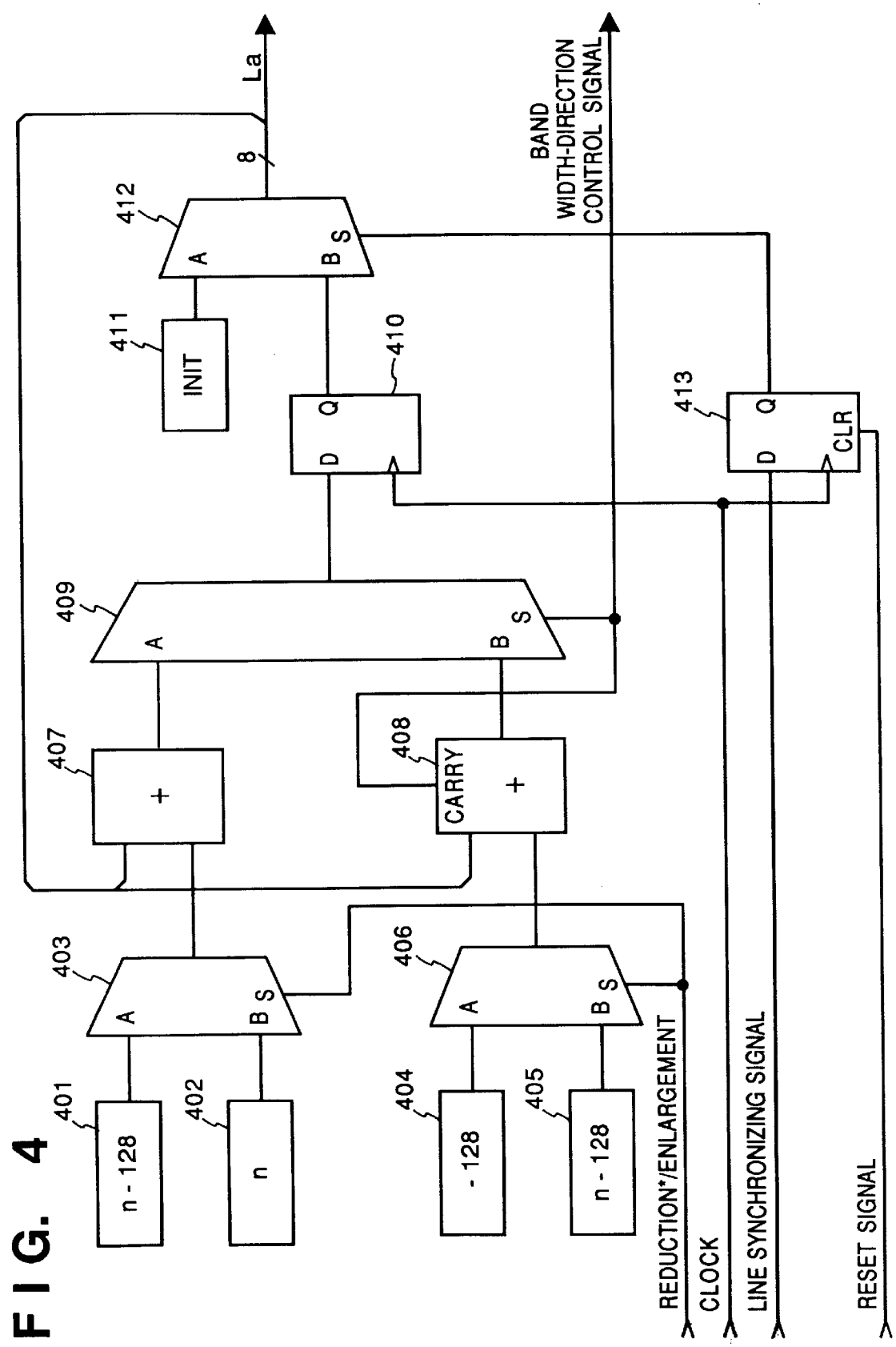
FIG. 4 is a block diagram showing the detailed construction of an arithmetic unit which calculates the length of a side in the width direction of a band.

FIG. 4 is a block diagram illustrating the arithmetic unit 111 for calculating the length of the side in the width direction of the band. As shown in FIG. 4, a value n−128 possessed by a block 401 and a value n possessed by a block 402 enter a selector 403. The selector 403 outputs the value of block 401 when a reduction*/enlargement signal to a terminal S of the selector is at the low logic level and the value of block 402 when the aforementioned signal is at the high logic level. A block 404 has a value of −128 and a block 405 a value of n−128. A selector 406 receives the values of blocks 404, 405 as inputs and outputs the value of block 404 when the reduction*/enlargement signal to the terminal S of the selector 406 is at the low logic level and the value of block 405 when the aforementioned signal is at the high logic level.

Values from adders 407, 408 enter a selector 409, which outputs the value of adder 407 when a carry signal from the adder 408 is "0" and the value of the adder 408 when this carry signal is "1". The output of the selector 409 enters an eight-bit latch 410. A block 411 possess an initial value indicative of the positional relationship of a pixel before conversion and a pixel after conversion. This value is capable of being rewritten by a CPU, not shown. The value from the block 411 and the value from a latch 410 enter a selector 412, which outputs the value of block 411 when initial pixel data is inputted to the selector 412. The latter outputs the value of latch 410 from the second pixel onward. A select signal applied to the selector 412 is the result of delaying the line synchronizing signal by one pixel using a flip-flop 413. The carry signal of the adder 408 is used also to control the image synchronizing clock of reduction processing in the width direction of the band and to control the image-request clock of enlargement processing in the width direction of the band.

When reduction processing is executed in the band-width direction, the reduction */enlargement signal in the band-width direction is at the low level and, hence, an input terminal a of the AND gate 121 in FIG. 1 is high. Accordingly, the band-width direction control signal outputted by the arithmetic unit 111 for calculating the length of the side in this direction becomes effective and the output-image synchronizing clock is controlled by the OR gate 123. When the band-width direction control signal is low, the output-image synchronizing clock is outputted and thinning-out is performed when this signal is high. Moreover, since an input terminal c of the AND gate 122 is low at this time, an input terminal f of the OR gate 124 also is low and the image-request clock is outputted at all times.

When the band-width direction is subjected to enlargement processing, the reduction */enlargement signal in the band-width direction becomes high and so does the input terminal c of the AND gate 122, as a result of which the band-width direction control signal becomes effective and the image-request clock is controlled by the OR gate 124. Accordingly, the image-request clock is outputted when the band-width direction control signal is high and thinning-out is performed when this signal is low. Since input terminal a of the AND gate 121 goes low at this time, input terminal e of the OR gate 123 also goes low at all times and, hence, the output image-request clock is outputted at all times.

Processing regarding the shuttle scanning direction is similar to that for the band-width direction and need not be described.

Figure 5:
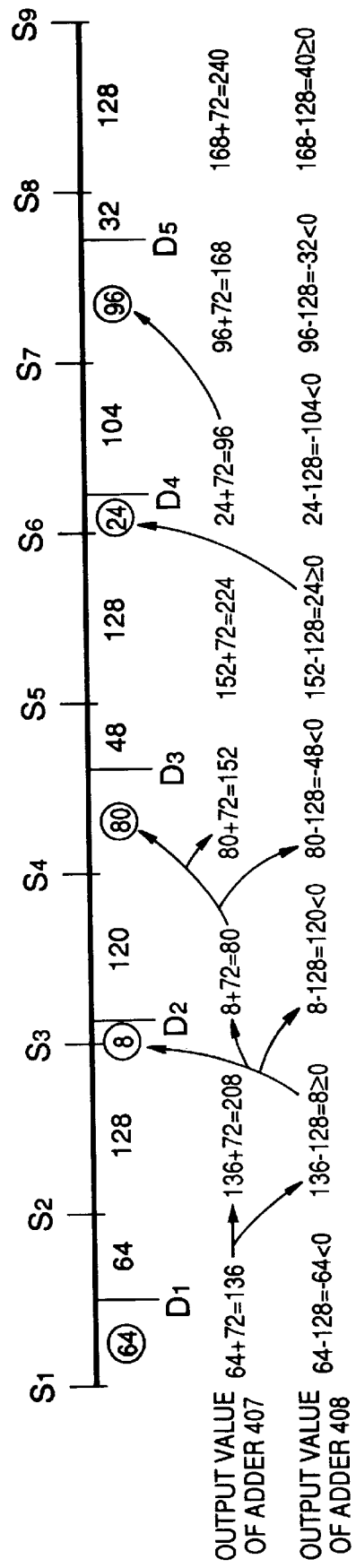
FIG. 5 is a diagram showing the positional relationship of pixels before and after conversion at the time of processing for a 64% reduction.
Figure 6:
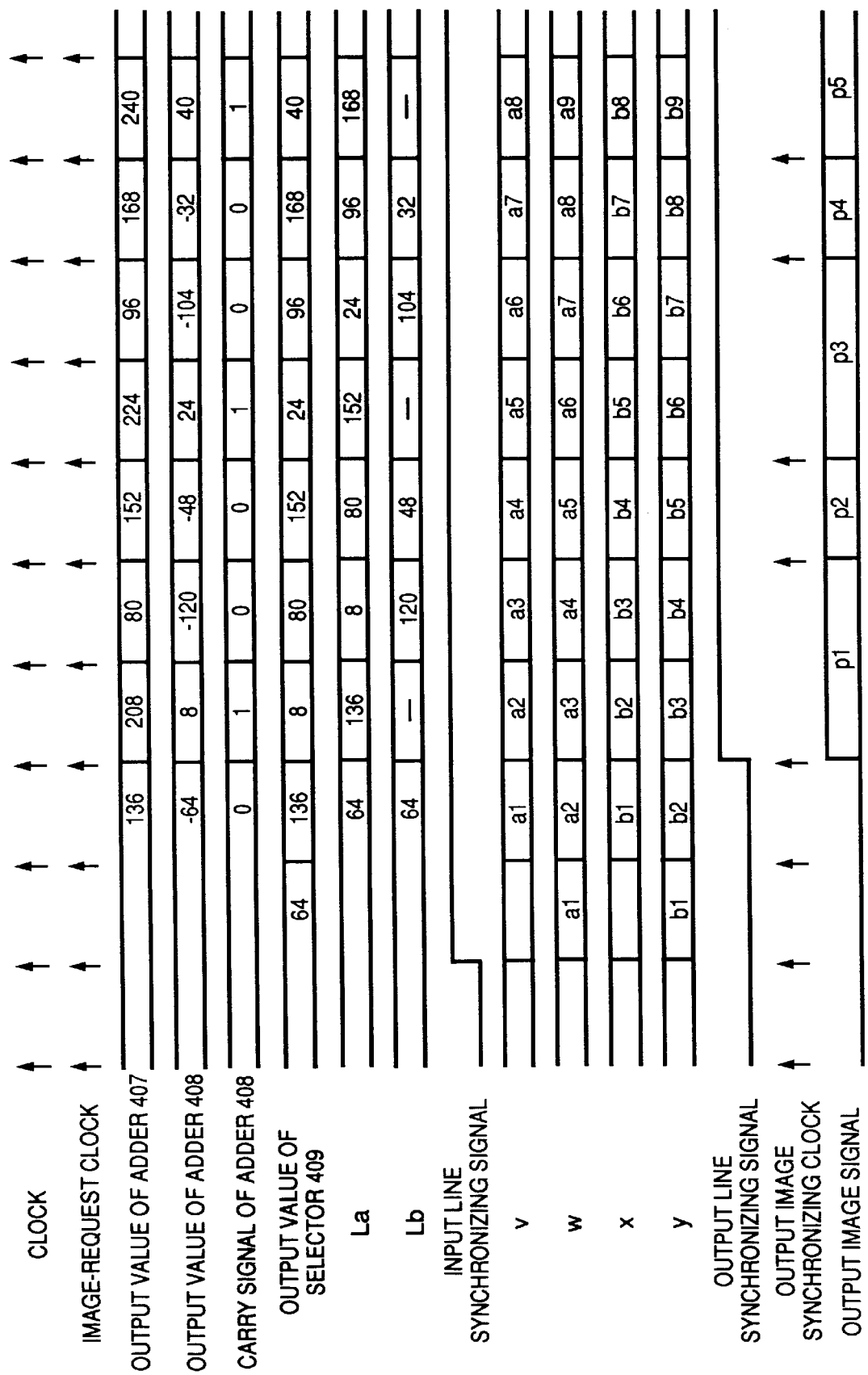
FIG. 6 is a timing chart when processing for a 64% reduction is performed.

The operation of the arithmetic unit 111 that calculates the length of the side in the width direction of the band will now be described using concrete numerical values. FIG. 5 is a diagram showing the length of the side when reduction processing at a magnification of 128/200 (64%) has been carried out. In FIG. 5, S1, S2, S3, . . . represent reference pixels before conversion, and D1, D2, D3, . . . represent pixels after conversion. FIG. 6 is a timing chart for reduction processing at the magnification of 128/200.

In FIG. 6, the clock is a basic operation clock produced by the oscillator 131 of FIG. 1. The image-request clock is a clock outputted to the image supply source, which delivers the image signal in synchronization with the image-request clock. The output value of the adder 407 is that of adder 407 in FIG. 4 illustrating the internal construction of the arithmetic unit 111 shown in FIG. 1. The output value and carry signal of the adder 408 similarly are those of adder 408 in FIG. 4.

As mentioned above, La is the result of calculating the length of the side performed by the arithmetic unit 111 of FIG. 1, and Lb is the output value of the subtractor 115 in FIG. 1. Further, an input-line synchronizing signal is the line synchronizing signal inputted to the linear-interpolation processor from the image supply source, v, w, x, y represents the reference pixels, 1, 2, 3, . . . denote numbers assigned in order to the pixels in the width direction of the band, and a, b, . . . indicate the order of the lines. The output-line synchronizing signal, output-image synchronizing clock and output image signal are image signals outputted by the linear-interpolation processor.

Description of Reduction Processing

In case of reduction processing, the reduction*/enlargement signal in FIG. 4 attains the low level and the selector 403 selects the value of block 401, as set forth above. The block 401 possesses a value of n−128. Since n=200 holds in this example, the value of block 401 is 72. Further, the selector 406 selects the value of block 404, which is a fixed value of −128 in this example.

The value of block 411 having the initial value of the side is 64 in this example. Initially, the selector 412 selects the value of block 411, and therefore the result of addition performed by the adder 407 is 64+72=136, and the result of addition performed by the adder 408 is 64−128=−64<0, as a result of which the carry signal from adder 408 is "0". Accordingly, La=64 is outputted. The selector 409 selects the value of adder 407, namely 136, and the latch 410 accepts this value at the timing of the leading edge of the image synchronizing clock. The output value of the latch is 136.

Next, the selector 412 selects the value of the latch 410, the result of addition performed by the adder 407 is 136+72=208, and the result of addition performed by the adder 408 is 136−128=8≧0, as a result of which the carry signal from adder 408 is "1". At this time the outputted image synchronizing clock is thinned out via the gate. The selector 409 selects the value of adder 408, namely 8, and the latch 410 accepts this value at the timing of the leading edge of the image synchronizing clock. The output value of the latch is 8.

The result of addition performed by the adder 407 is 8+72=80, and the result of addition performed by the adder 408 is 8−128=−120<0, as a result of which the carry signal from adder 408 is "0". Accordingly, La=8 is outputted. The selector 409 selects the value 8 of adder 407, and the latch 412 accepts this value. This operation is continued in similar fashion to calculate the value of the side, as illustrated in FIG. 5.

Description of Enlargement Processing

Figure 7:
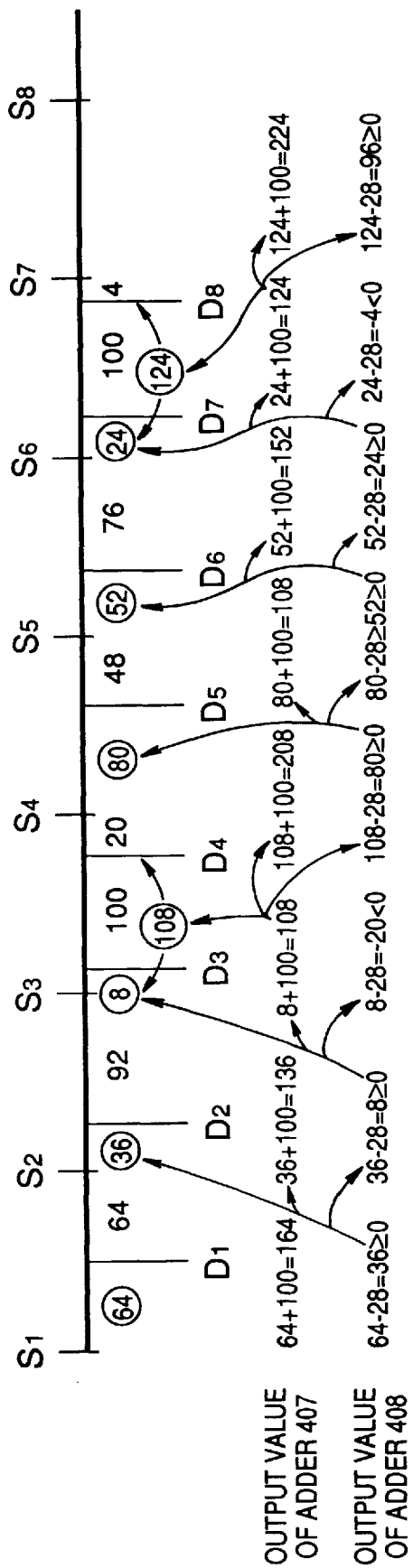
FIG. 7 is a diagram showing the positional relationship of pixels before and after conversion at the time of processing for a 128% enlargement.

FIG. 7 is a diagram showing the length of the side when enlargement processing at a magnification of 128/100 (128%) has been carried out. The meanings of the symbols here are the same as those in FIG. 5.

Figure 8:
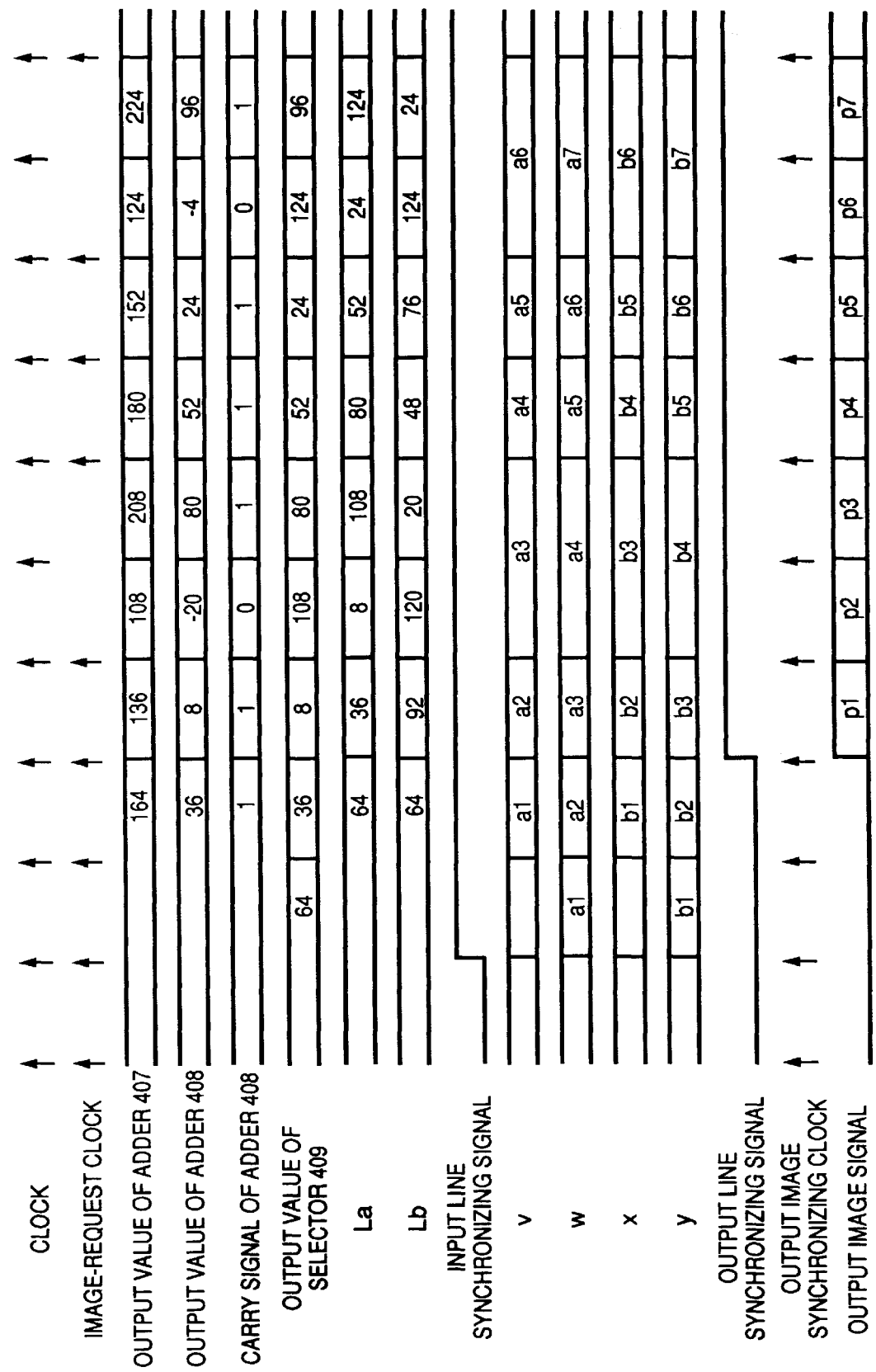
FIG. 8 is a timing chart when processing for a 128% enlargement is performed.

FIG. 8 is a timing chart for enlargement processing at the magnification of 128/100. These signals also are similar to those shown in FIG. 6 and need not be described again.

In case of enlargement processing, the reduction*/enlargement signal in FIG. 4 attains the high level and the selector 403 selects the value of block 402, as set forth above. The block 402 possesses a value of n. Since n=100 holds in this example, the output value of block 403 is 100. Further, the selector 406 selects the value of block 405, which is n−128. When n=100 holds, therefore, the value of block 405 becomes 100−128=−28.

If the initial value possessed by block 411 is assumed to be 64, the result of addition performed by the adder 407 is 64+100=164 and the result of addition performed by the adder 408 is 64−28≧0 since the selector 412 initially selects the value of block 411. Consequently, the carry signal from adder 408 is "1". Accordingly, the image-request clock is outputted to the image supply source and the pixel referred to next is updated. La=64 is outputted as the length of the side. The selector 409 selects the value 36 of adder 408, and the latch 410 accepts this value at the timing of the leading edge of the image synchronizing clock. The output value of the latch is 36.

Next, since the selector 412 selects the value of the latch 410, the result of addition performed by the adder 407 is 36+100=136, and the result of addition performed by the adder 408 is 36−28=8≧0, as a result of which the carry signal from adder 408 is "1". Accordingly, the image-request clock is outputted and the pixel referred to next is updated. La=36 is outputted as the length of the side. The selector 409 selects the value 8 of adder 408, and the latch 410 accepts this value at the timing of the leading edge of the image synchronizing clock. The output value of the latch is 8.

The result of addition performed by the adder 407 is 8+100=108, and the result of addition performed by the adder 408 is 8−28=−20<0, as a result of which the carry signal from adder 408 is "0". Accordingly, the image-request clock is thinned out and the pixel referred to next is updated. La=8 is outputted as the length of the side. The selector 409 selects the value 108 of adder 407, and the latch 412 accepts this value. This operation is continued in similar fashion to calculate the value of the side, as illustrated in FIG. 7.

The processing for calculating the length of the band in the width direction thereof is performed in the manner set forth above.

With regard to the arithmetic unit that calculates the length of the side in the shuttle scanning direction, the construction thereof is the same as that of the processor that calculates the length of the side in the band-width direction. The method of calculation also is substantially the same as that of the processor that calculates the length of the side in the band-width direction. Accordingly, in a case where a single pulse is used per line instead of the clock of latch 410 and reduction processing is performed in the shuttle scanning direction, the carry signal from the adder 408 is employed as the gate signal with respect to the line synchronizing signal. In case of enlargement processing, the carry signal of the adder 408 is employed as the gate signal with respect to the line request signal of the image supply source. A method of calculating the shuttle scanning direction can be described by rewriting "reference pixel" to read "reference line". Further, the level of an output pixel is calculated from the reference-pixel level and the area of a rectangle formed by a pixel before conversion and a pixel after conversion.

Description of 1/1 Scaling Processing

Figure 9:
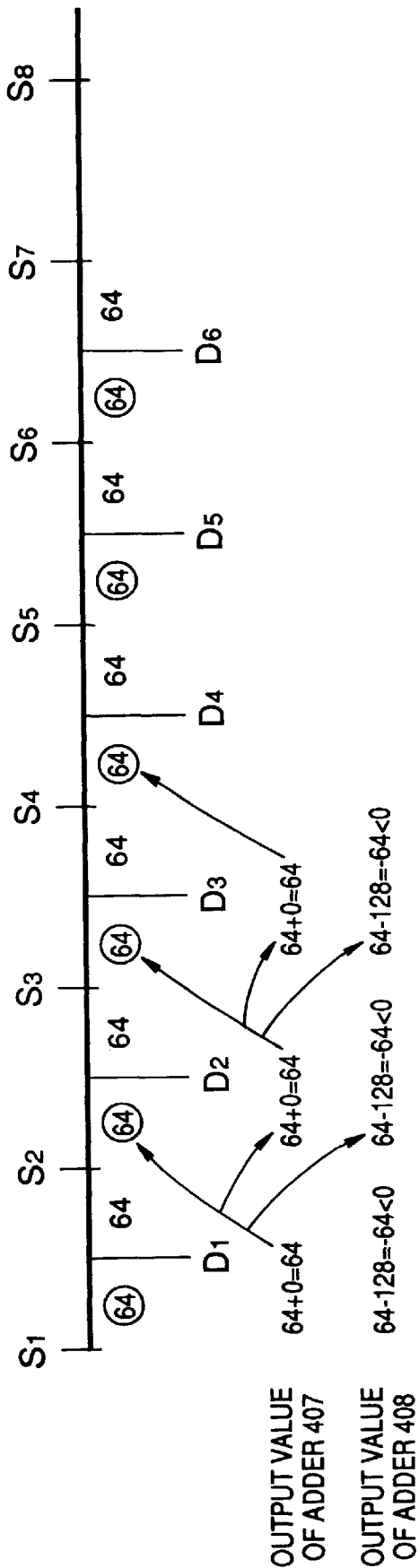
FIG. 9 is a diagram showing the positional relationship of pixels before and after conversion in a case where 1/1 scaling processing is performed by a reduction arithmetic method.
Figure 10:
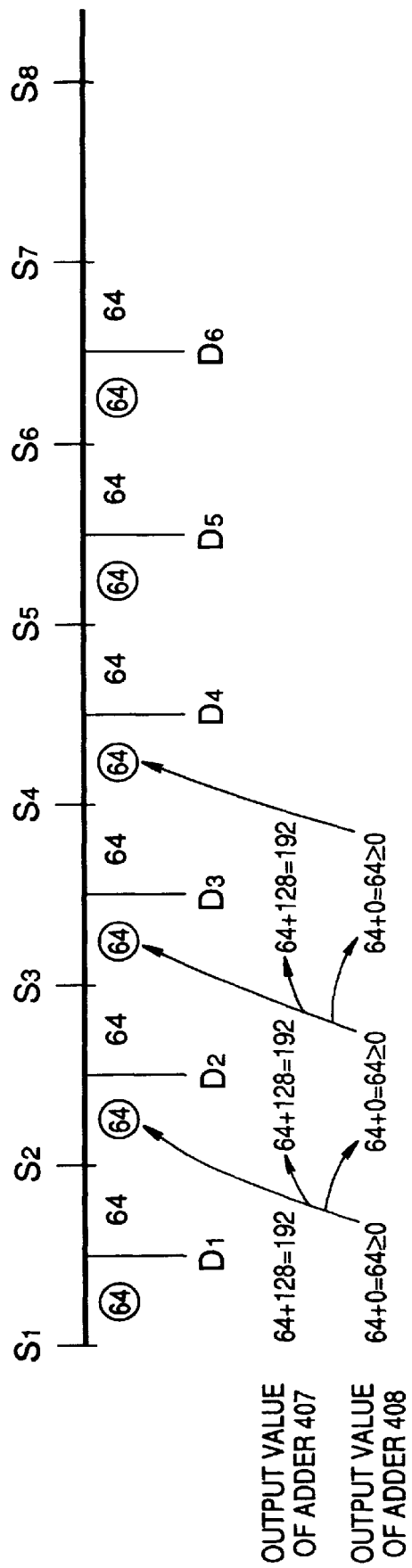
FIG. 10 is a diagram showing the positional relationship of pixels before and after conversion in a case where 1/1 scaling processing is performed by an enlargement arithmetic method.

FIG. 9 is a diagram showing a case where 1/1 scaling processing is performed by a reduction-processing arithmetic method, and FIG. 10 is a diagram corresponding to a case in which 1/1 scaling processing is performed by a enlargement-processing arithmetic method.

FIG. 9 shows the length of the side when reduction processing at a magnification of 128/128 (100%) has been carried out. Since reduction processing is performed, the reduction*/enlargement signal assumes the low level and the selector 403 selects the value of block 401, as set forth above. The block 401 possesses a value of n−128. Since n=128 holds in this example, the output value of block 401 is 0. Further, the selector 406 selects the value of block 404, which is fixed at −128.

The value of block 411 having the initial value of the side is 64. Since selector 412 initially selects the value of block 411, the result of addition performed by the adder 407 is 64+0=64, and the result of addition performed by the adder 408 is 64−128=−64<0, as a result of which the carry signal from adder 408 is "0". Accordingly, La=64 is outputted. The selector 409 selects the value 64 of adder 407, and the latch 410 accepts this value at the timing of the leading edge of the image synchronizing clock. The output value of the latch is 64.

Next, the selector 412 selects the value of the latch 410, the result of addition performed by the adder 407 is 64+0= 64, and the result of addition performed by the adder 408 is 64−128=−64<0, as a result of which the carry signal from adder 408 is "0". Accordingly, La=64 is outputted. The selector 409 selects the value 64 of adder 407, and the latch 410 accepts this value at the timing of the leading edge of the image synchronizing clock. The output value of the latch is 64. The value of the side is calculated in this manner from this point onward, La is 64 at all times, the carry signal of adder 408 is "0" at all times, and the output clock is outputted at all times. Thus, 1/1 scaling processing is executed using the reduction-processing arithmetic method.

A case in which 1/1 scaling processing is performed by an enlargement-processing arithmetic method will now be described.

FIG. 10 shows the length of the side when enlargement processing at a magnification of 128/128 (100%) has been carried out. When enlargement processing is performed, the reduction*/enlargement signal assumes the high level and the selector 403 selects the value of block 402, as set forth above. The block 402 possesses a value of n. Since n=128 holds in this example, the output value of block 403 is 128. Further, the selector 406 selects the value of block 405, which possesses a value of n−128. Since n=128 holds, this value becomes 128−128=0.

If the value of block 411 having the initial value of the side is 64, the selector 412 initially selects the value of block 411, the result of addition performed by the adder 407 is 64+128=192, and the result of addition performed by the adder 408 is 64+0=64≧0, as a result of which the carry signal from adder 408 is "1". Accordingly, the image-request clock is outputted to the image supply source and the pixel referred to next is updated. La=64 is outputted as the length of the side.

The selector 409 selects the value 64 of adder 408, and the latch 410 accepts this value at the timing of the leading edge of the image synchronizing clock. The output value of the latch is 64.

Next, the selector 412 selects the value of the latch 410, the result of addition performed by the adder 407 is 64+128= 192, and the result of addition performed by the adder 408 is 64+0=64≧0, as a result of which the carry signal from adder 408 is "1". Accordingly, the image-request clock is outputted and the pixel referred to next is updated. La=64 is outputted as the length of the side.

The selector 409 selects the value 64 of adder 408, and the latch 410 accepts this value at the timing of the leading edge of the image synchronizing clock. The output value of the latch is 64. The value of the side is calculated in this manner from this point onward, La is 64 at all times, the carry signal of adder 408 is "1" at all times, and the image-request clock is outputted at all times. Thus, 1/1 scaling processing is executed using the enlargement-processing arithmetic method.

Figure 14:
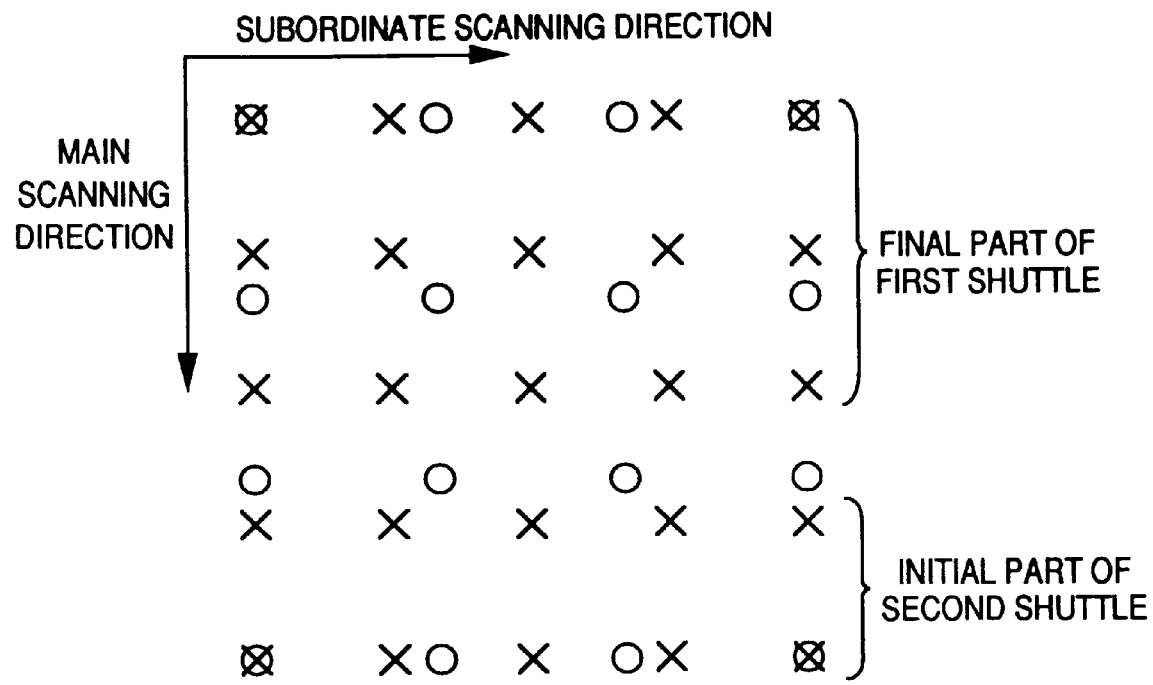
FIG. 14 is a diagram showing the positional relationship of pixels before and after conversion in a case where processing is applied to seams between shuttles.
Figure 15:
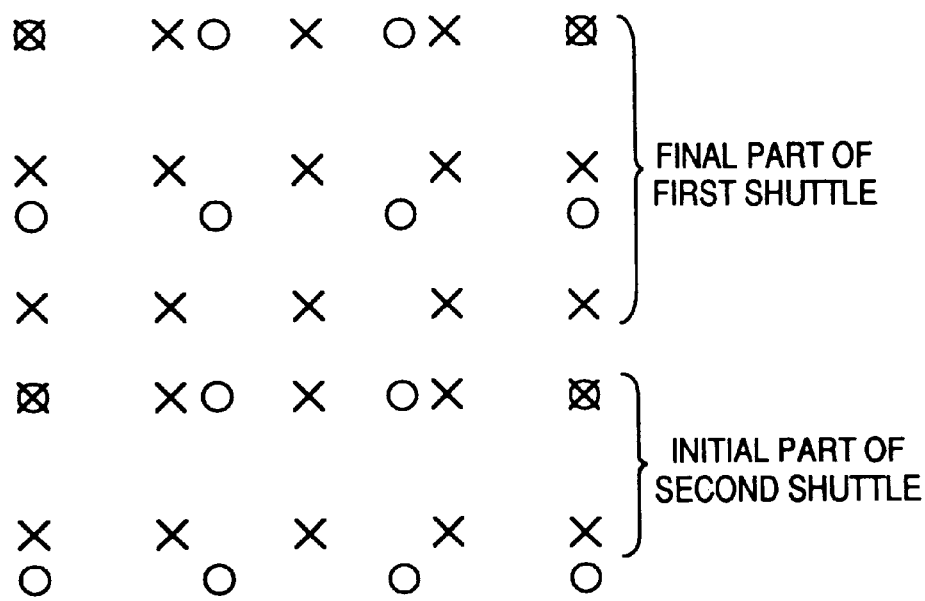
FIG. 15 is a diagram showing the positional relationship of pixels before and after conversion in a prior-art case where processing is not applied to seams between shuttles.

When scaling processing is performed in band units, it is necessary to be aware of the band seams. FIG. 14 is a diagram showing an image before and after conversion at a seam between bands. The circle marks are pixels before conversion and the x marks are pixels after conversion. FIG. 14 is an example in which initial values of the second band in the main scanning direction have been set. Pixel distance after conversion is held constant. It should be noted that the main scanning direction and subordinate scanning direction are based upon the serial method and correspond to the band-width direction and shuttle scanning direction.

The vertical-horizontal conversion processing and linear-interpolation processing described above is performed as follows with regard to the overall image: First, the image read by the scanner 1601 is subjected to scaling processing by the linear-interpolation processor 1602, a vertical-horizontal conversion is performed by the vertical-horizontal conversion processor 1603, and the result is stored in the image memory device 1605. When the image is recorded, first a horizontal-vertical conversion is performed by the horizontal-vertical conversion processor 1604, scaling processing which is the reverse of that performed on the reading side is carried out by the linear-interpolation processor 1602 and the result is recorded by the printer 1606.

The vertical-horizontal conversion processing will be described next.

Description of Vertical-Horizontal Conversion Processing

Figure 18:
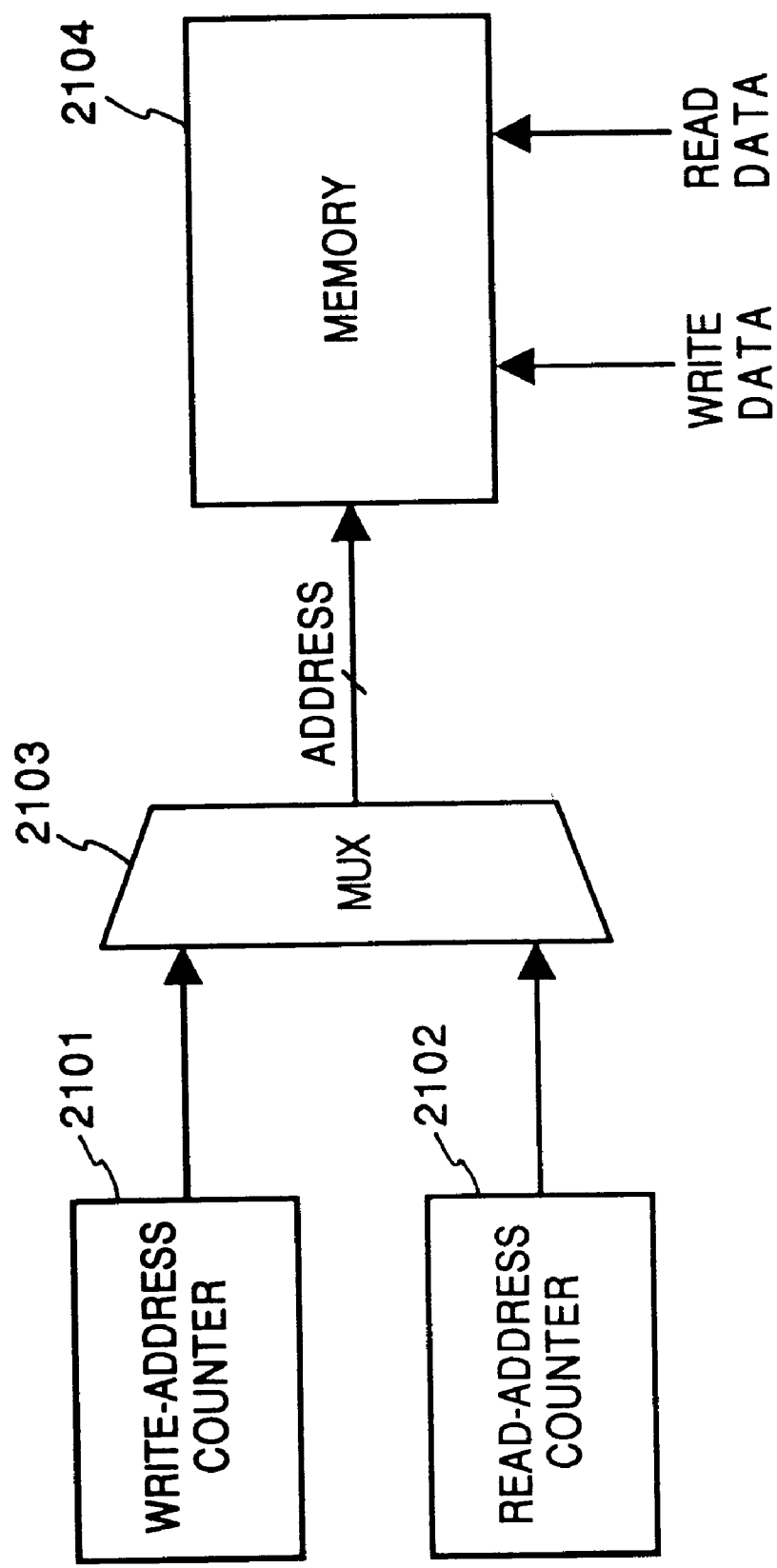
FIG. 18 is a block diagram of a vertical-horizontal conversion processor.

FIG. 18 is a block diagram of the vertical-horizontal conversion processor. The processor includes a write-address counter 2101, a read-address counter 2102, a multiplexer 2103 and a memory 2104. FIG. 17 is a diagram illustrating the coordinates of a row of image data in a case where there are 4096 pixels in the shuttle scanning direction and 256 pixels in the band-width direction. FIG. 19 is a diagram showing the relationship between storage addresses and data in the memory 2104 when this image has been read in serially.

First, the image data is inputted serially and is stored in the order of the addresses shown in FIG. 19 in the serial format, namely in the vertical direction in FIG. 17. In this case, the image data of FIG. 17 is assumed to be one band of data read in serially with a band width of 256 pixels. The component that generates the addresses for storing the data at this time is the write-address counter 2101.

When the image data that has thus been stored in the memory 2104 is read out, readout is performed by outputting the addresses in the order 00000H, 00100H, 00200H, . . . , FFF00H, . . .

00001H, 00201H, 00201H, . . . , FFF01H, . . .

FFBFFH, FFCFFH, FFDFFH, FFEFFH, FFFFFH and the read data is stored in the memory 1605, whereby the vertical-horizontal conversion from the serial format to the raster format is achieved. The component that generates the addresses at readout is the read-address counter 2102. The multiplexer 2103 outputs the value of the count in counter 2101 at writing time and the value of the counter in counter 2102 at reading time to the address of the memory 2104. As a result, the stored content based upon the raster format is as shown in FIG. 20.

The horizontal-vertical conversion processor 1604 on the recording side performs a conversion from the raster format to the serial format by processing that is the reverse of that executed by the vertical-horizontal conversion processor 1603 on the writing side. The horizontal-vertical converter outputs memory addresses serially and writes the image data in the memory 2104 in the format of FIG. 20. At readout, the addresses are outputted in the order 00000H, 01000H, 02000H, . . . , FF000H, . . .

00001H, 01001H, 02001H, . . . , FF001H, . . .

.

.

FBFFFH, FCFFFH, FDFFFH, FEFFFH, FFFFFH whereby the horizontal-vertical conversion from the raster format to the serial format is achieved. In actuality, one screen comprises a plurality of bands rather than a single band. In order to process one screen, therefore, the foregoing conversion is repeated a number of times equivalent to the number of bands constituting one screen. Of course, the width of the band is not limited to 256 pixels but may be any number of pixels.

Thus, the image data is subjected to a horizontal-vertical conversion from the raster format and the resulting data is printed out by the serial printer 1606. A printer of the kind shown in FIG. 22 is available as this printer.

Figure 22:
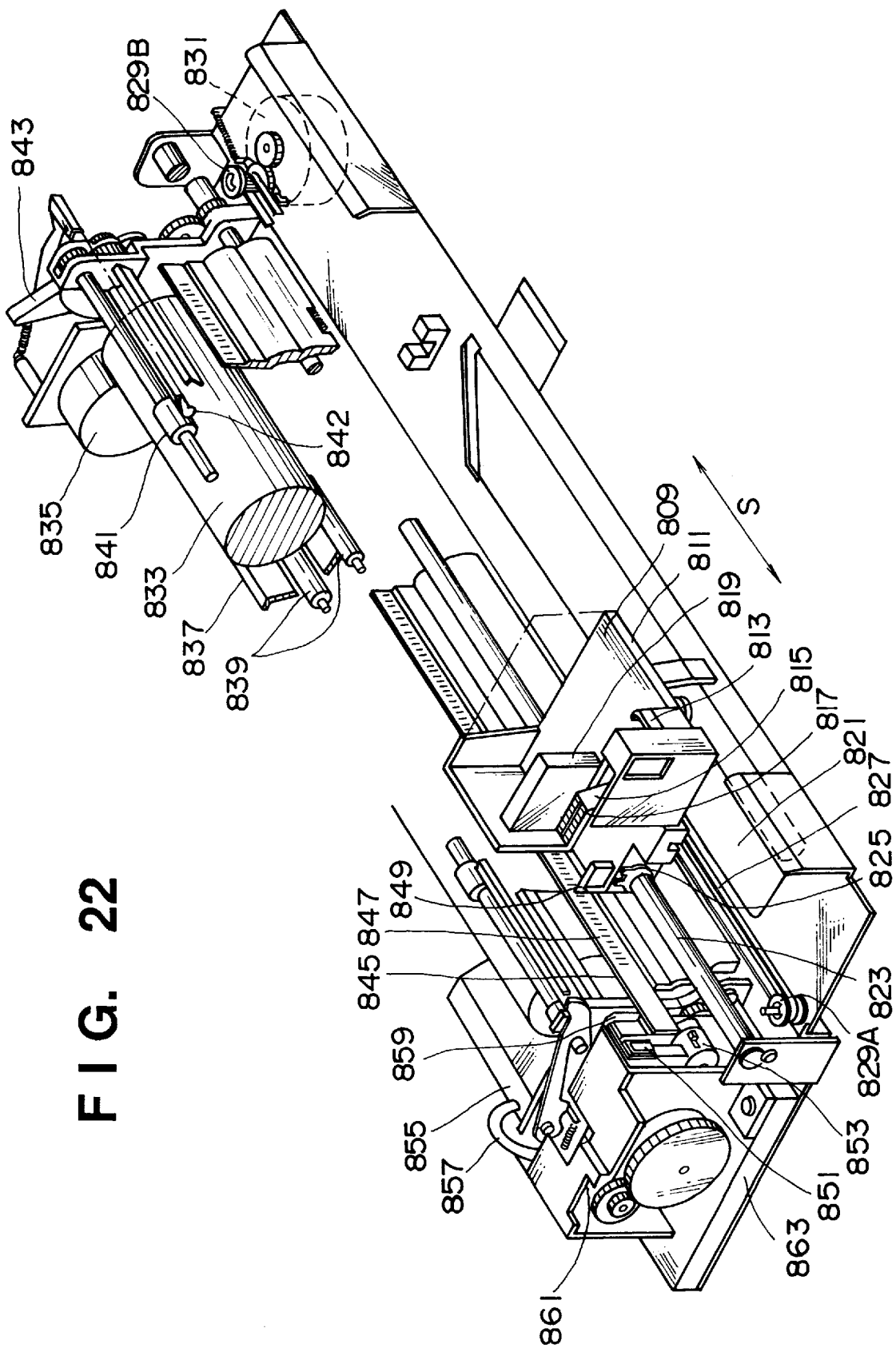
FIG. 22 is an external view of a printer used in the embodiment.

FIG. 22 is an ink-jet printer that includes a head cartridge 809 having an ink-jet recording head and is mounted on and scanned in the S direction by a carriage 811. The head cartridge 809 is mounted on the carriage 811 by a hook 813, which is operated by a lever 815. The lever 815 is provided with a marker 817 for indicating graduations, which are provided on a cover, described later, in order to make it possible to read a printing position of the recording head of the head cartridge 809 or the set position thereof. A support plate 819 supports the electrical connection portion for the head cartridge 809. The electrical connection portion and the controller of the main body are interconnected by a flexible cable 821.

A guide shaft 823 is for guiding the carriage 811 in the S direction and is passed through a bearing 825 of the carriage 811. The latter is fixedly secured to a timing belt 827. The timing belt 827, which is for transmitting a motive force that transports the carriage 811 in the S direction, is stretched between pulleys 829A, 829B disposed on opposite sides of the apparatus. The driving force produced by a carriage motor 831 is transmitted to the pulley 829B via a transmission mechanism composed of gears or the like.

A platen roller 833 regulates the recording surface of a recording medium such as paper (referred to as recording paper hereinafter) and conveys the recording paper at the time of recording or the like. The platen roller 833 is driven by a conveyance motor 835. A paper pan 837 guides the recording paper to a recording position from the side of a paper feed tray. Feed rollers 839 are arranged in the feed path of the recording paper and urge the recording paper against the platen roller 833 so that the recording paper may be conveyed. A paper-discharge roller 841 is arranged downstream of the recording position relative to the recording-paper conveyance direction and serves to discharge the recording paper toward a discharge port, not shown. A spur 842 is provided so as to correspond to the paper-discharge roller 841 and urges the roller 841 via the recording paper so that a force for conveying the recording paper by the roller 841 is produced. A release lever 843 is for releasing the feed roller 839, a leaf spring 845 and the spur 842 from a biasing force when, say, the recording paper is installed and set.

The keep plate 845 suppresses lift-up of the recording paper in the proximity of the recording position and assures that the recording paper will remain in intimate contact with the platen roller 833. In the printer of this embodiment, an ink-jet recording head is employed in which recording is performed by the jetting of ink. Accordingly, the distance between the surface forming the ink jetting port of the recording head and the recording surface of the recording paper must be comparatively small and, moreover, the spacing between the recording paper and the surface forming the ink jetting port must be strictly controlled to avoid contact between the two. The keep plate 845 is effective for this purpose. A scale 847 is provided on the keep plate 845, and a marker 849 is provided on the carriage 811 at a location corresponding to the scale 847. The scale 847 and marker 849 also make it possible to read the printing position or set position of the recording head.

A cap 851, which is provided at a position that opposes the surface forming the ink jetting port of the recording head when the recording head is in the home position is capable of contacting and of separating from the recording head. The cap 851 is made of a flexible material such as rubber and is used to protect the recording head when recording is not in progress. It is also used when the recording head is subjected to processing for jetting recovery. Processing for jetting recovery refers to processing (pre-jetting) wherein an energy generating element provided within the ink jetting port and utilized to jet the ink is driven into operation to discharge the ink from the entire jetting port, thereby eliminating such causes of ink-jetting failure as air bubbles, dust and ink that has become too viscous to be suitable for recording, as well as to processing wherein the ink is forcibly jetted from the jetting port to eliminate jetting failure.

A pump 853 generates a suction force in order to forcibly discharge the ink and is used in order to draw in ink that collects in the cap 851 when jetting recovery processing by forcible discharge or jetting recovery processing by pre-jetting is executed. Waste ink drawn in by the pump 853 collects in an waste ink tank 855. The pump 853 and waste ink tank 855 are communicated by a tube 857.

A blade 859 weaves over the surface that forms the jetting port of the recording head. The blade 859 is movably supported at a position where it is projected toward the recording head to perform weaving during the course of head movement and at a retracted position where it does not engage the surface forming the jetting port. A cam device 863 is acted upon by the motive force transmitted from a recovery motor 861 and serves to drive the pump 853 and to move the cap 851 and blade 859. It should be noted that this example relates to a bubble-jet printer. However, it goes without saying that the present invention is applicable also to an aerojet printer so long as it is a serial printer.

As set forth above, scaling processing is applied to serial-format image information, as a result of which the line buffer need only have a capacity corresponding to the band width. Stated in terms of the example of FIG. 17, a 4096-pixel buffer is required if a raster format is the object, but a 256-pixel buffer will suffice in case of a serial format.

Further, an initial value of the positional relationship between a pixel before initial conversion and a pixel after initial conversion in the shuttle scanning direction is set so that the positional relationship between a pixel before conversion and a pixel after conversion will not shift from one band to another. As a result, no disturbance of the image occurs at the seam between bands.

It should be noted that even if the scanner and printer both are not of the serial type, the present invention is applicable if one is of the serial type.

Second Embodiment

Figure 21:
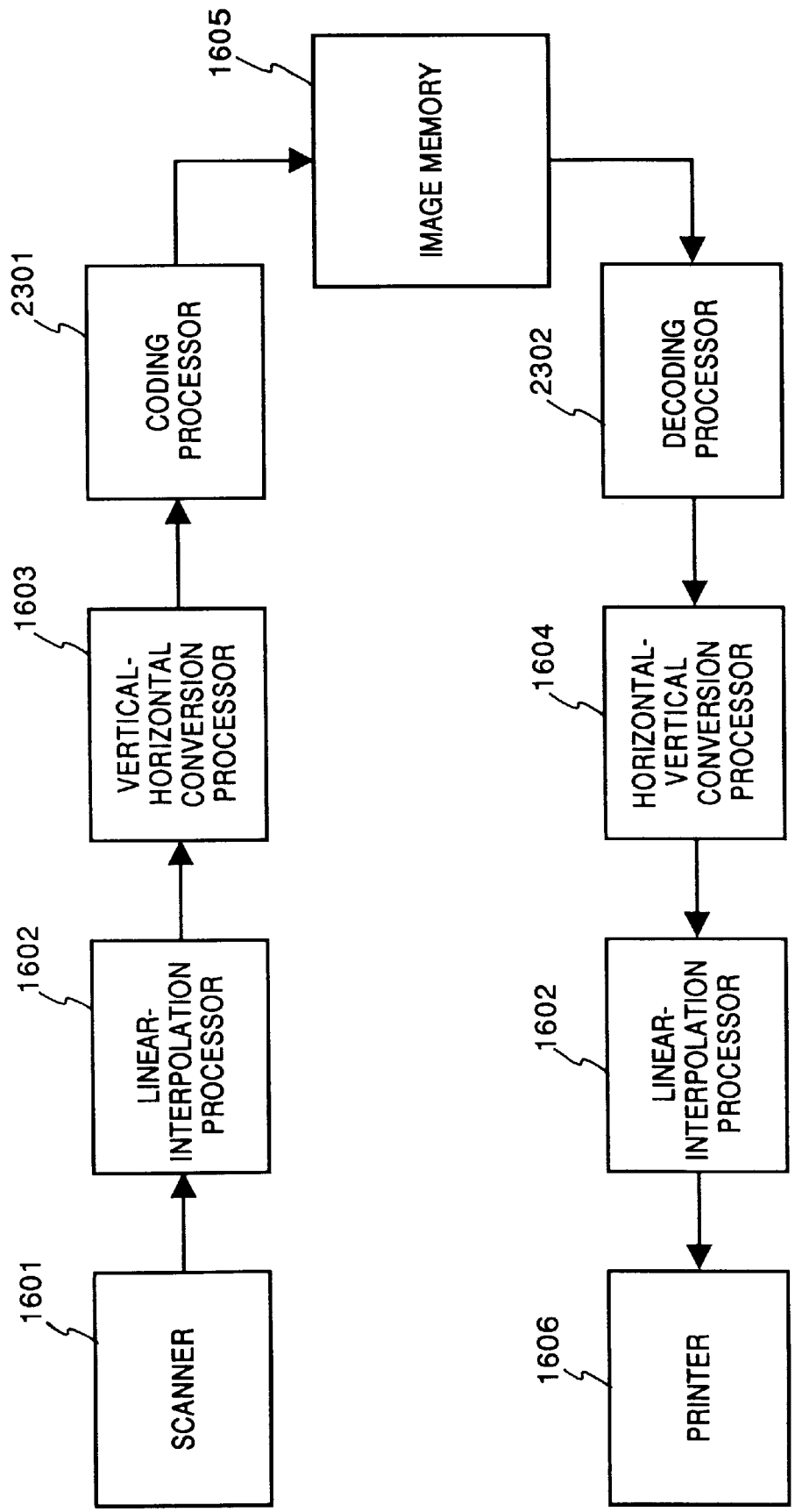
FIG. 21 is a block diagram showing an image processing apparatus according to a second embodiment of the present invention.

FIG. 21 is a block diagram showing a second embodiment of the present invention. This apparatus differs from that of the first embodiment shown in FIG. 13 in that a coding processor 2301 is inserted between the vertical-horizontal conversion processor 1603 on the input side and the image memory 1605 and a decoding processor 2302 is provided between the image memory 1605 and the vertical-horizontal conversion processor 1604 on the output side. The image data read in from the scanner 1601 and subjected to processing by the linear-interpolation processor 1602 and the vertical-horizontal conversion processor 1603 is coded by the coding processor 2301.

Since the image data read out of the image memory 1605 has been coded, it is decoded by the decoding processor 2302 before the vertical-horizontal conversion is performed.

Since the image data is stored in the image memory 1605 after the quantity thereof is reduced in quantity by coding, the resources needed for storing the data can be reduced.

Third Embodiment

Figure 33:
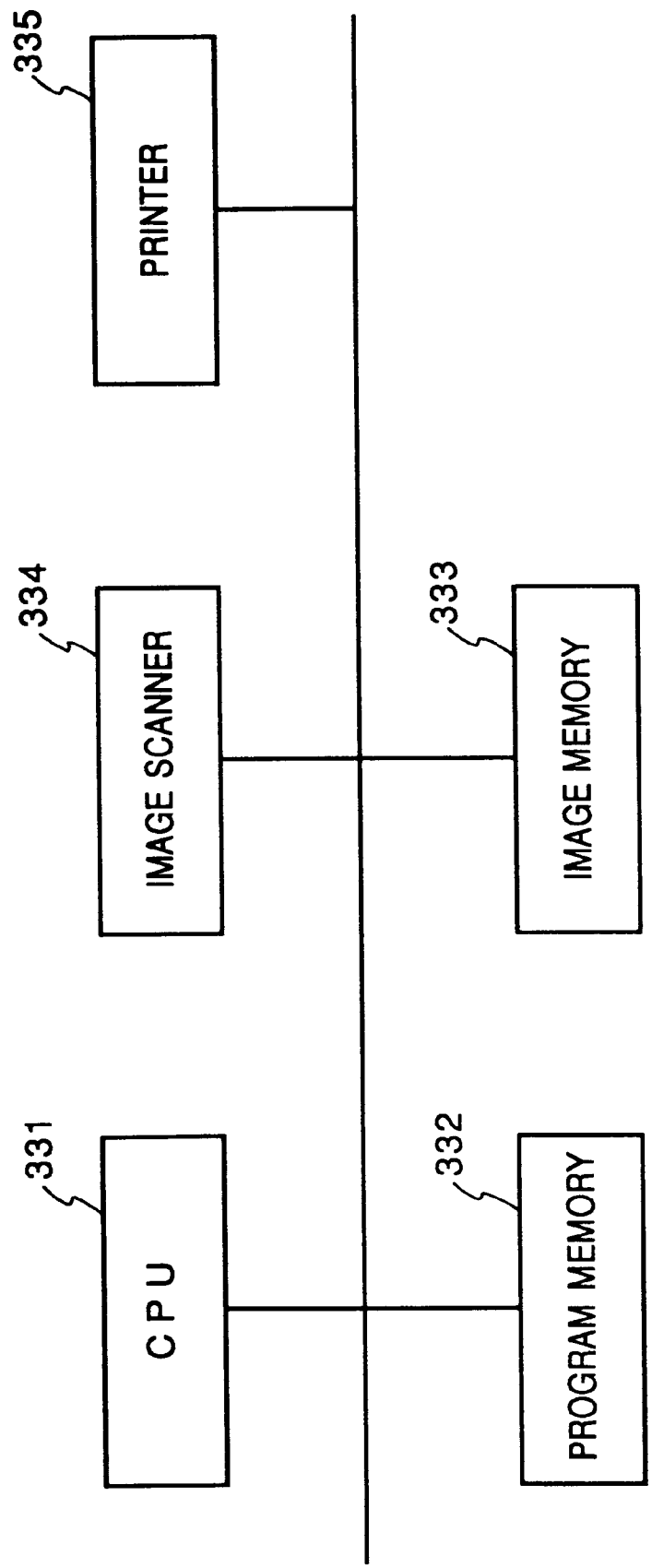
FIG. 33 is a block diagram showing an image processing apparatus according to another embodiment.

In the first embodiment, it is described that processing is performed by the apparatus constructed as shown in FIG. 13. However, this processing can be executed by using the apparatus of FIG. 33 instead. The apparatus shown in FIG. 33 is adapted to read in the image data from a serial-type image scanner 334, store the image data in an image memory 333 in a raster format and print out the image from a serial printer 335. Control of the apparatus and processing of the image data are performed by a CPU 331. The CPU 331 implements the foregoing processing by executing a program that has been stored in a program memory 332.

The linear-interpolation processor 1602, the vertical-horizontal conversion processor 1603 and the horizontal-vertical processor 1604 in FIG. 13 are realized by execution of the program by the CPU 331 in FIG. 33. Since the image data generally is of very large quantity, there are instances in which the processing thereof is executed by special-purpose hardware. An apparatus obtained by adding this special-purpose hardware for image processing to the arrangement shown in FIG. 33 can be said to be the apparatus of FIG. 13. Accordingly, the flowcharts shown in FIGS. 34 and 35 can be considered procedures in which the processing of the first embodiment has been successively rewritten.

Figure 34:
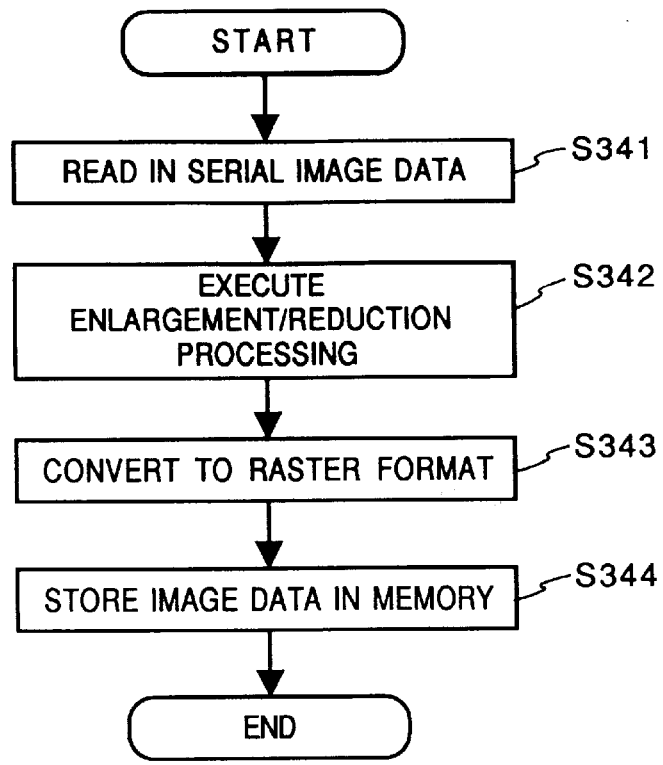
FIG. 34 is a flowchart illustrating a procedure, executed by the apparatus of FIG. 33, for reading in an image.

FIG. 34 is a flowchart illustrating a procedure executed by the apparatus of FIG. 33 in order to read in an image. At step S341 in FIG. 34, serial-format image data is read in by the image scanner 334. Next, the serial-format data is subjected to scaling processing for enlargement or reduction at step S342. The processing of this step may be linear interpolation processing, as described earlier. The procedure described above in which processing is executed while controlling logic circuits by control signals may readily be made a procedure executed in successive fashion. The serial-format image data that has been subjected to scaling processing is converted into the raster format at step S343. This procedure also is as described earlier, and it will suffice merely to rewrite the addresses. A detailed description, therefore, is omitted. Step S344 calls for the image data that has been converted into the raster format to be stored in the image memory 333. In the foregoing processing, step S342 is scaling processing for data in the serial format, and therefore this embodiment provides the same effects as the first embodiment.

Figure 35:
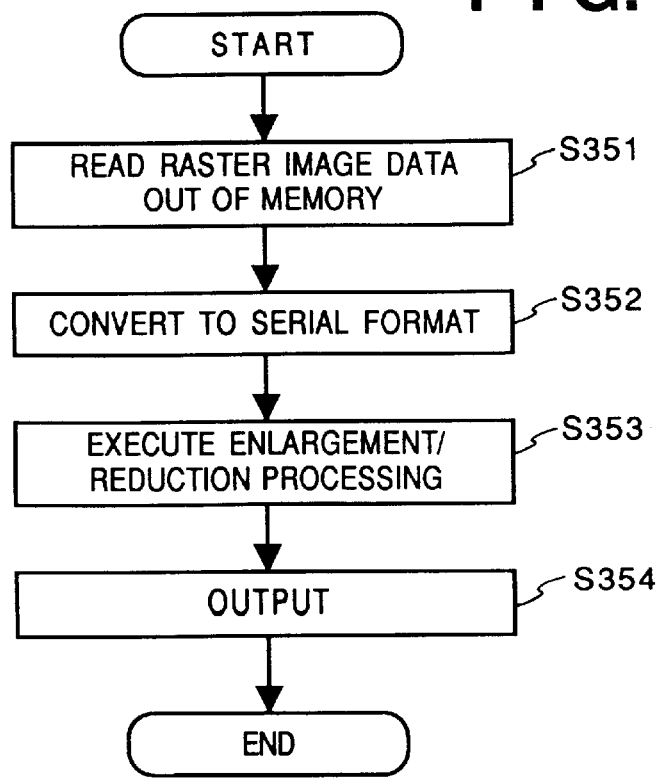
FIG. 35 is a flowchart illustrating a procedure, executed by the apparatus of FIG. 33, for outputting an image.

FIG. 35 is a flowchart illustrating a procedure executed by the apparatus of FIG. 33 in order to output an image. At step S351 in FIG. 35, the raster-format image data is read out of the image memory 333. This image data is converted into the serial format at step S352. This processing, which is a procedure that is the reverse of that of step S343, in one through which the operations described in the first embodiment are performed in successive fashion. The image data thus converted into the serial format is subjected to scaling processing, such as enlargement or reduction, at step S353. Since the serial-format data is the data of interest, just as in step S342 above, an effect that can be obtained is that the amount of data held for the purpose of scaling processing need only be that corresponding to the main-scan length of the serial format (namely shuttle width). Finally, at step S354, the image data is outputted from the serial printer 335.

Thus, in the scaling step, the serial-format data is adopted as the data of interest, and therefore an effect that can be obtained is that the amount of data held need only be that corresponding to the main-scan length of the serial format (namely shuttle width).

This embodiment can be applied to the second embodiment so that coding and decoding may be applied before and after, respectively, the storage of the image data in the image memory.

Fourth Embodiment

Figure 23:
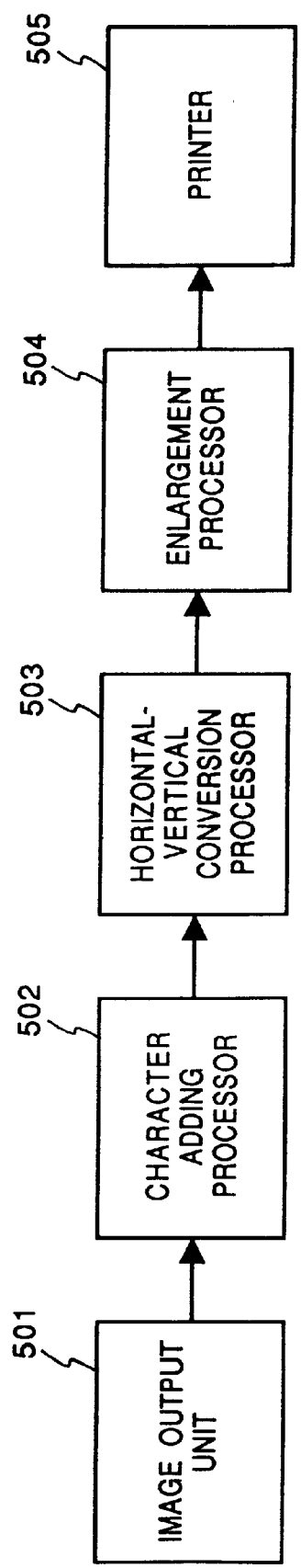
FIG. 23 is a block diagram showing an image processing apparatus according to the embodiment.

FIG. 23 is a block diagram illustrating the image processing apparatus of this embodiment. Here an image output unit 501 outputs image data in the raster format. A character adding processor 502 adds an image (a character), which has been generated from code data, to the output data from the image output unit 501. A horizontal-vertical conversion processor 503 converts the raster-format image data into a format suited to the serial method. An enlargement processor 504 enlarges the image data, and a serial printer 505 records the image on a recording medium while the medium is scanned at predetermined band widths.

The manner in which the recording operation is performed in the image processing apparatus thus constructed will now be described.

Adding on of Code Data

Figure 28:
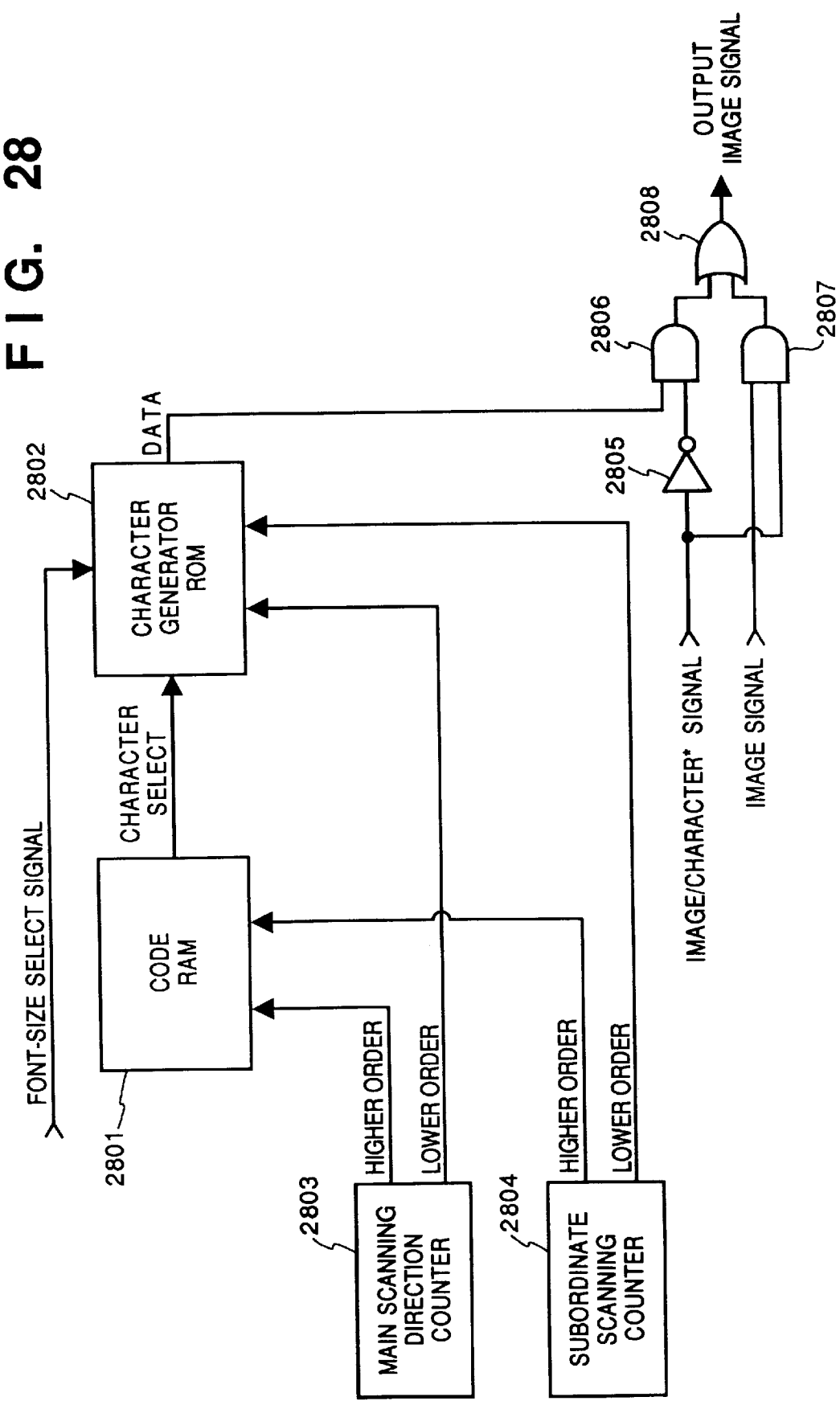
FIG. 28 is a block diagram showing a processor for adding on a character.

The details of the character adding processor 502 will now be described in detail. FIG. 28 is a block diagram showing the character adding processor. A CPU (not shown) is capable of writing code data, which is to be recorded, in a code RAM 2801. When code data, font size and a scanning address are inputted to a character generator ROM 2802, character data of a dot image is outputted on a data line. The font size is set from the CPU, not shown.

Figure 31:
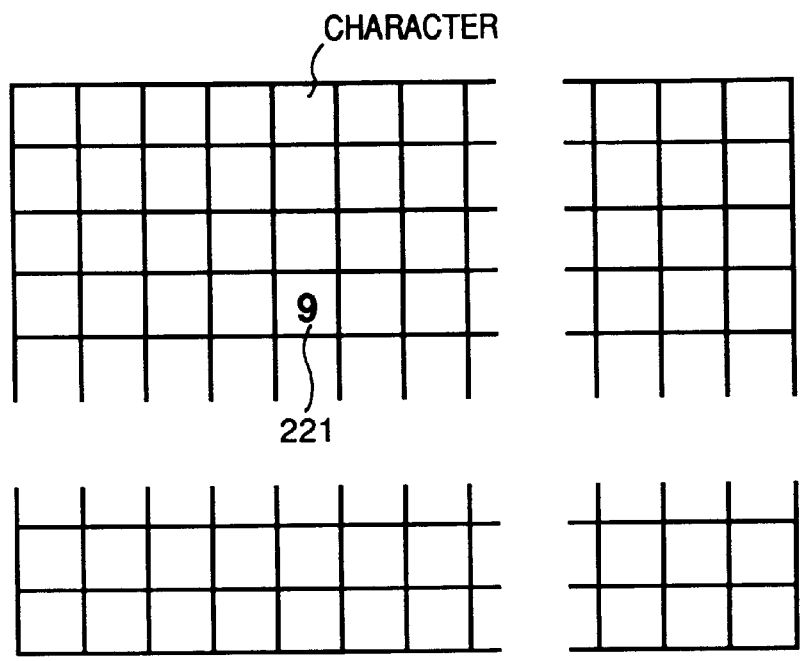
FIG. 31 is a diagram in which character placement on a screen is imaged.
Figure 32:
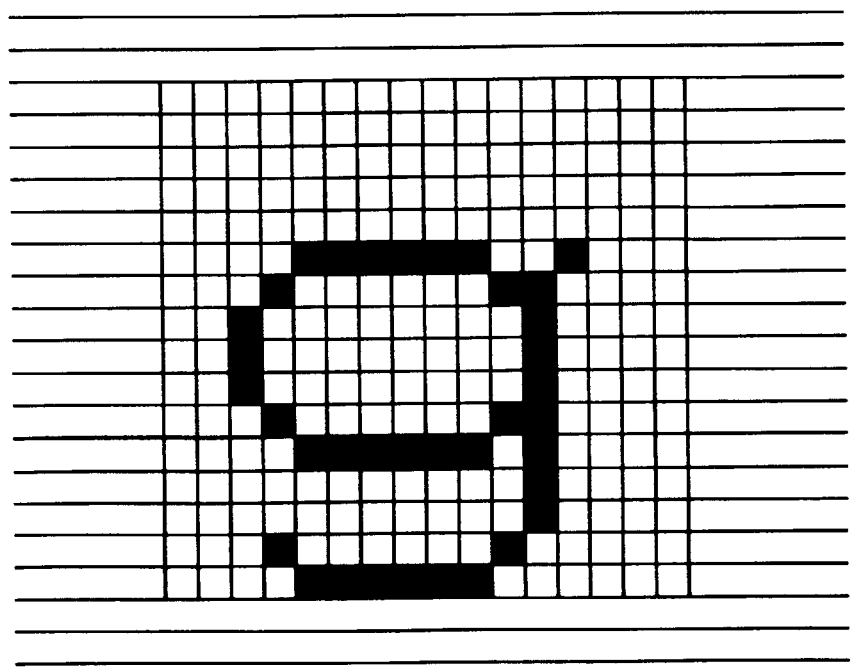
FIG. 32 is a diagram showing the constitution of one character.

A main scanning direction counter 2803 updates the code data in the main scanning direction and updates the scanning address of the character generator ROM 2802 in the main scanning direction. A subordinate scanning direction counter 2804 updates the character data in the subordinate scanning direction and updates the scanning address of the character generator ROM 2802 in the subordinate scanning direction. The main scanning direction counter 2803 inputs lower order bits, which represent the address of a dot constituting the character itself, to the character generator ROM 2802, and the subordinate scanning direction counter inputs higher order bits, which represent the position of each character, to the code RAM 2801. In other words, code data, which has been assigned addresses in character units, is stored in the code RAM 2801 so as to correspond to the addresses, as shown in FIG. 31. For example, a code of the alphabetic character "g" is stored at a location 221 indicated by a certain character address. If this code has been selected by the higher order bits of the counters 2803 and 2804, an image corresponding to the code "g" is read out of the character generator ROM 2802, as shown in FIG. 32, the image is outputted in dot units by the lower order bits of the counters 28003, 2804. In the example of FIG. 32, the character is composed of 16×16 dots, and the address inputs from these counters are composed of four bits each.

Gates 2805~2808 construct a selector whose select signal is an image/character* signal. These gates serve to combine the image of the character, obtained as set forth above, with the image data. When the image/character* signal outputted by the CPU, not shown, is at the low level, the AND gate 2806 opens to output the image data. When the image/character* signal is at the high level, the AND gate 2807 opens to output the image data. Control for such a changeover is necessary and the portion of the recording medium where there is a changeover between the header portion and the image portion on a facsimile document.

Thus, as set forth above, the code data and image data are combined.

Description of Horizontal-Vertical Conversion Processing

The horizontal-vertical conversion processor 503 will be described next. FIG. 18 is a block diagram illustrating the construction of the horizontal-vertical conversion processor. The outputs of the write-address counter 2101 and read-address counter 2102 enter the multiplexer 2103, the output of which is inputted to the memory as an address. FIG. 17 is a diagram illustrating coordinates in a case where there are 4096 pixels in the shuttle scanning direction and 256 pixels in the subordinate scanning direction. FIG. 20 is a diagram showing the relationship between addresses of the memory 2104 and data stored in the memory at the locations designated by these addresses.

First, the image data outputted from the image output unit 501 and processed by the character adding processor 502 is inputted to the memory 2104 in the raster format and is stored in the order of the addresses, as shown in FIG. 20. The component that generates the addresses for storing the data at this time is the write-address counter 2101. At the writing of the input data, addresses are assigned in successive fashion as the data in written in. At readout, the vertical-horizontal conversion is realized by applying the addresses to the memory as follows:

00000H, 01000H, 02000H, . . . , FF000H, . . .
00001H, 01001H, 02001H, . . . , FF001H, . . .
FBFFFH, FCFFFH, FDFFFH, FEFFFH, FFFFFH

The component that generates the addresses at readout is the read-address counter 2102. By performing addressing in this manner, the data read out has the following order:

(1,1), (2,1), (3,1), . . . , (256,1), . . .
(1,2), (2,2), (3,2), . . . , (256,2), . . .
. . . (254,4096), (255,4096), (256,4096)

In FIG. 18, the multiplexer 2103 delivers the counted value in counter 2101 to the address of the memory 2104 at the time of the write operation and the counted value in counter 2102 to the address of the memory 2104 at the time of the read operation.

Description of Enlargement Processing

Figure 24:
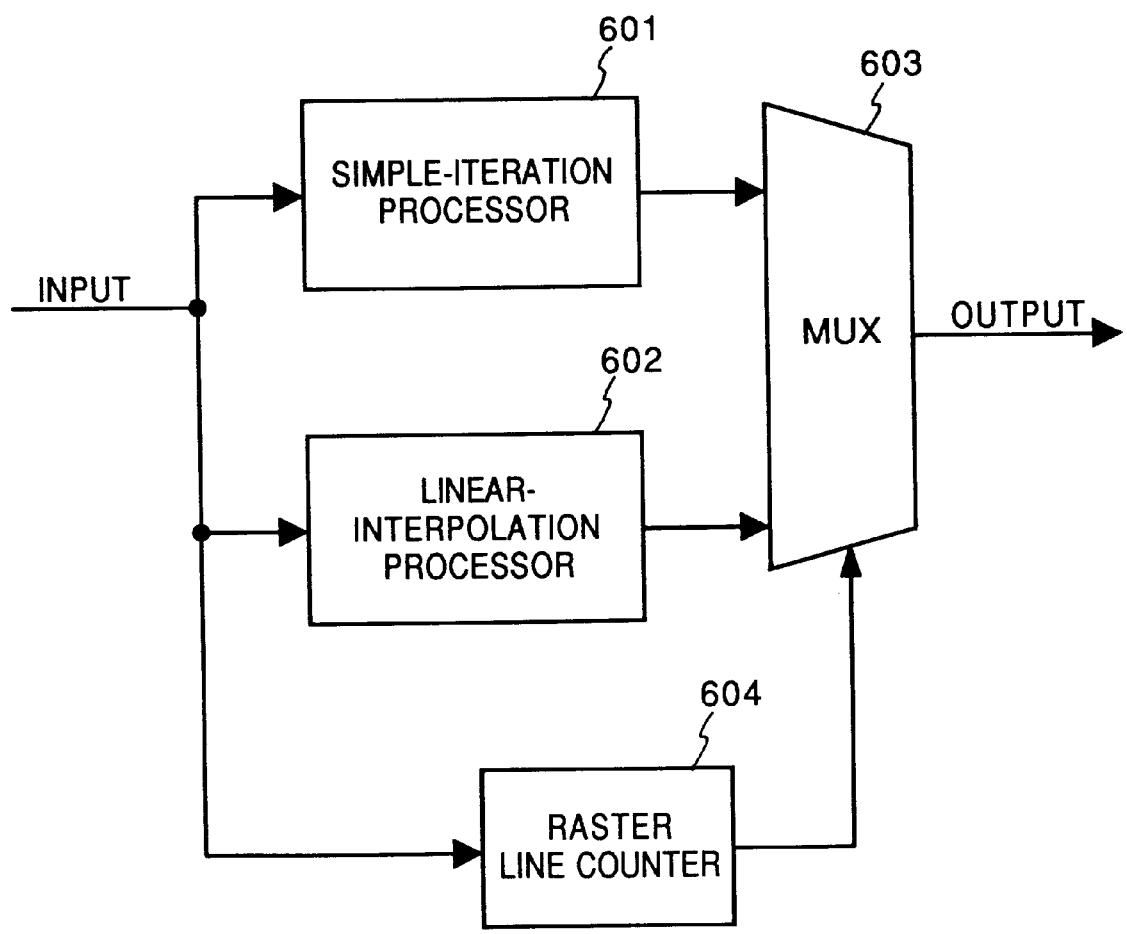
FIG. 24 is a block diagram of enlargement processing.
Figure 25:
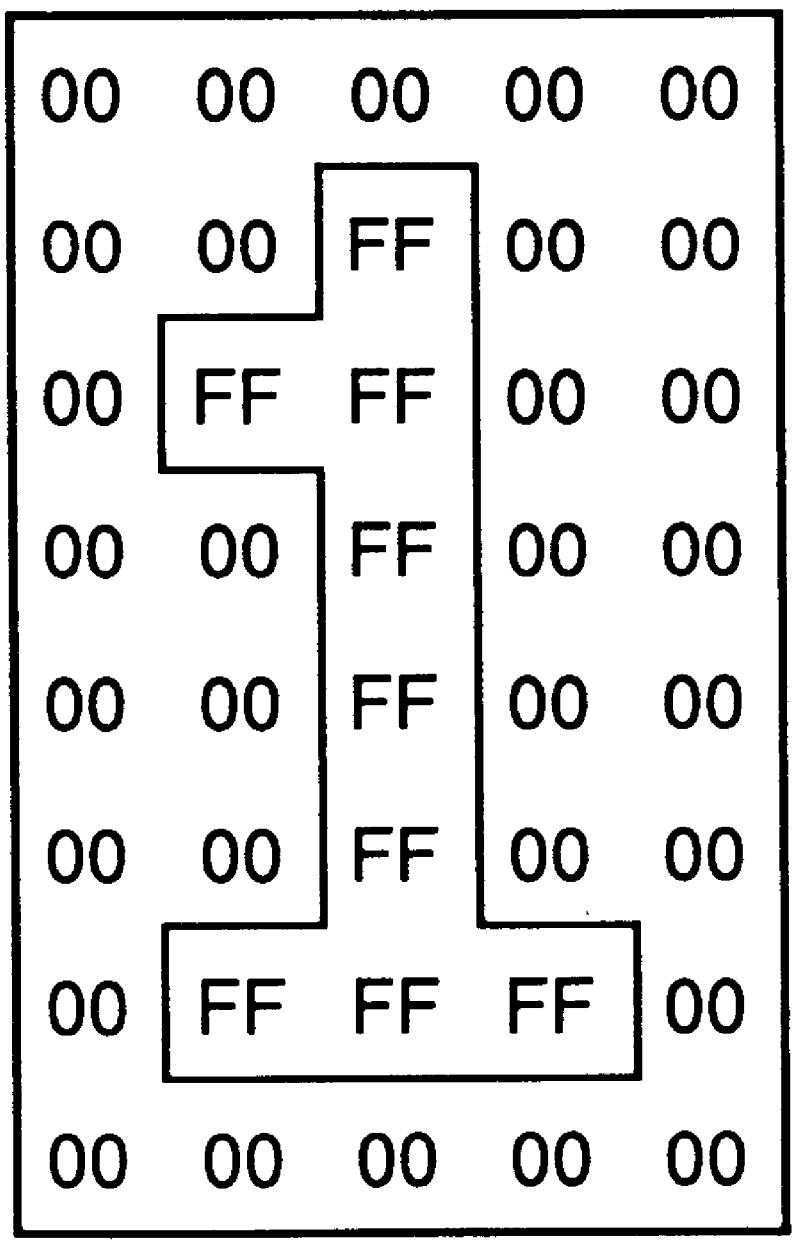
FIG. 25 shows an example of a character before enlargement.

The enlargement processor 504 will now be described. FIG. 24 is a block diagram showing the construction of the enlargement processor. The latter includes a simple-iteration processor 601 that performs enlargement processing upon simply iterating the original image, a linear-interpolation processor 602 that performs enlargement processing using a method of linear interpolation, a raster-line counter 604 and a multiplexer 603 whose inputs are the outputs of the processors 601, 602 and the output of the counter 604. FIGS. 25~27 show examples of enlargement processing. FIG. 25 is an original image, FIG. 26 the image obtained by enlarging the original image using linear interpolation processing, and FIG. 27 the image obtained by enlarging the original image using simple iteration processing. In FIGS. 25~27, the two-digit numerals represent the density of each pixel, in which "00" indicates white and "FF" indicates black having the highest density. Whereas the original figure possesses a clearly defined contour, the enlargement by linear interpolation is such that the density at the periphery of the figure declines slightly, thereby producing a blurry contour. By contrast, the enlargement based upon simple iteration is characterized in that the character is enlarged while the density of the original figure is maintained, as a result of which the contour remains distinct.

The image data inputted to the enlargement processor 504 is subjected to the vertical-horizontal conversion and is placed in the serial format. Those items of image data (pixels) in the process of being outputted that correspond to the particular line in terms of raster lines are counted by the raster line counter 604. By setting the range of raster lines in which the character resides in the multiplexer 603 beforehand, the multiplexer will output the data from the simple-iteration processor 601 when the value in the counter 604 lies in the area in which the character resides. At all other times, the multiplexer will output the data from the linear-interpolation processor 602.

Linear interpolation processing has been described in detail in the first embodiment, and the positions and levels of pixels at the time of image enlargement are decided in line with the procedure of the first embodiment.

In the enlargement processor 504, a disparity between the resolution of the input image and the resolution of the printer is dealt with by scaling processing. However, in order to render size constant at the time of recording of the code data added on, a font size stored in the character generator ROM 2802 of the character adding processor 502 must be selected appropriately. For example, in a case where the resolution of the printer is 400 dpi×400 dpi, the font size that should be selected is 48×48 dots to produce the character, as shown in FIG. 30. In other words, font size is made to correspond to the resolution of the input image.

Printer Description

FIG. 16 is a diagram showing the method of recording performed by the printer. Numeral 1905 denotes the recording paper. The recording head 1901, which is equipped with 256 of the nozzles 1902, records the area 1903 in the first scan and the area 1904 in the second scan. One page of the image is recorded by repeating this operation. An example of such a serial printer is an ink-jet printer, the function of which is as described in the first embodiment.

It goes without saying that the present invention is applicable not only to the system of the first embodiment but also to an aerojet printer that jets ink by utilizing an air flow. Of course, the invention is not limited to an ink-jet system but can be applied to any printer that is of the serial type.

In the image processing apparatus which performs recording using the above-described processing, characters are added to raster-format image data. Processing is therefore simple. Further, when a character generated from code data is enlarged by linear interpolation, the contour becomes indistinct, and when enlargement processing based upon simile iteration is applied to image data of a natural image, smoothness is lost. Therefore, according to the present invention, character portions are identified and enlargement processing is performed by separate methods, namely one suited to the image and one suited to the characters. This makes it possible to obtain an enlarged image that is faithful to the original image.

In the present embodiment, character areas and image areas are changed over in raster-line units. However, it is permissible to specify a window designated by rows and columns and effect the changeover by such a window.

Fifth Embodiment

Figure 29:
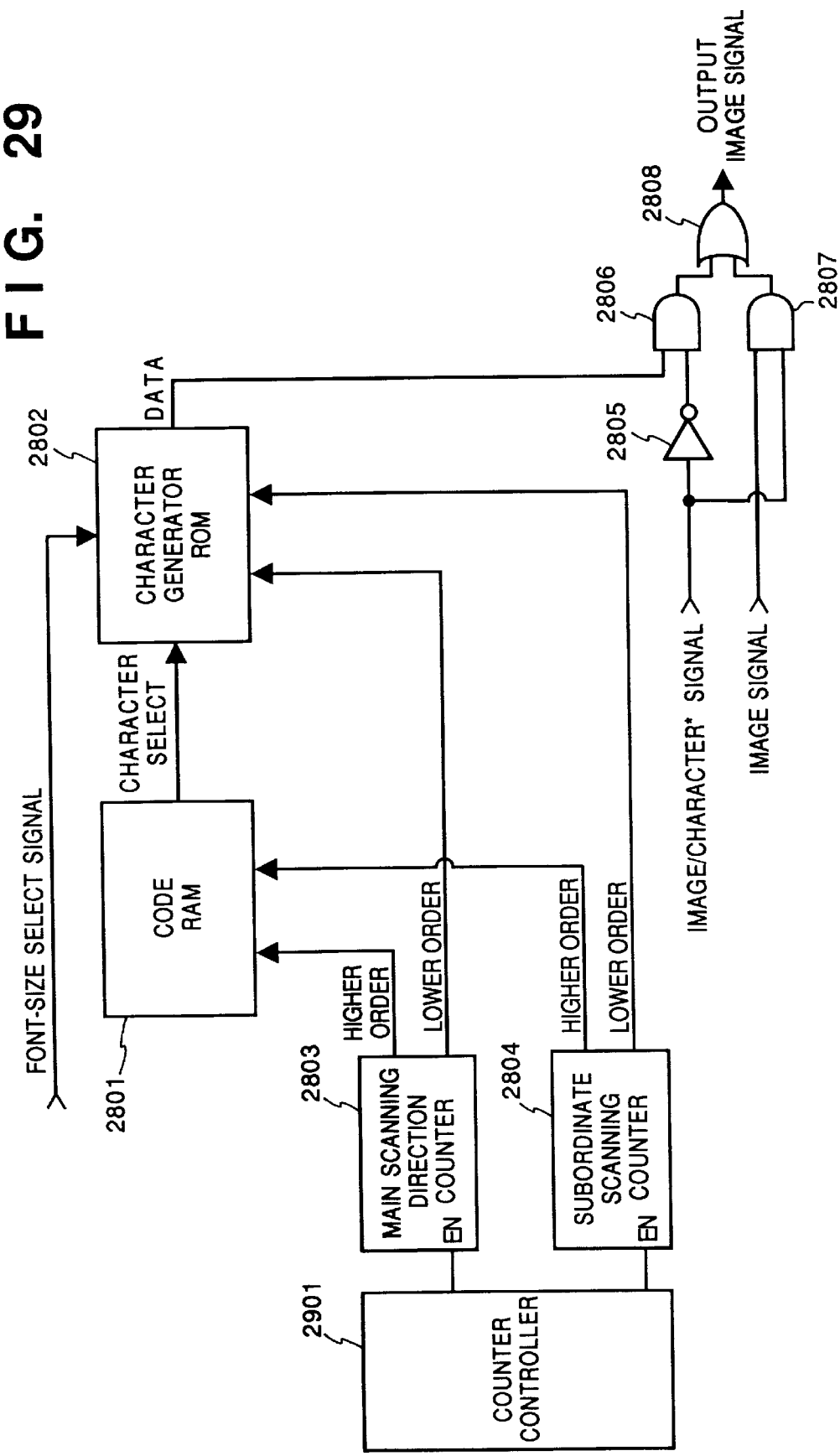
FIG. 29 is a block diagram showing a processor for adding on a character according to a second embodiment.

Since there is a limitation upon the font sizes provided in the character adding processor shown in FIG. 28, the processor cannot accommodate the resolution of any input image. However, if a counter controller 2901 is provided, as shown in FIG. 29, in order to make it possible to halt the operation of the counters 2803, 2804, a font size smaller than the objective font size may be selected and the operations of the counters may be less frequent in the band-width direction and shuttle scanning direction, respectively, thereby making it possible to realize any font size. More specifically, the counters 2803, 2804 are provided with an enable input EN that is made "1" when the counter is desired to be incremented and "0" when the counter is desired to be stopped. When the counter for the main scanning direction is stopped every clock pulse during a character output from the character generator ROM 2802, the width of the character is doubled. When the counter for the subordinate scanning direction is stopped every line, on the other hand, the height of the character is doubled. Of course, the image/character* signal must be synchronized. Accordingly, the limitation upon the resolution of the input image also is eliminated.

Sixth Embodiment

In the fourth embodiment, a case is described in which enlargement processing is applied to an input image. However, an image processing apparatus that outputs an image upon performing reduction processing is also conceivable. In such case, a character area is subjected to reduction processing by simple thinning-out processing, and an image area is subjected to reduction processing by linear interpolation processing. Reduction processing by linear interpolation is as described in the first embodiment.

Seventh Embodiment

Figure 36:
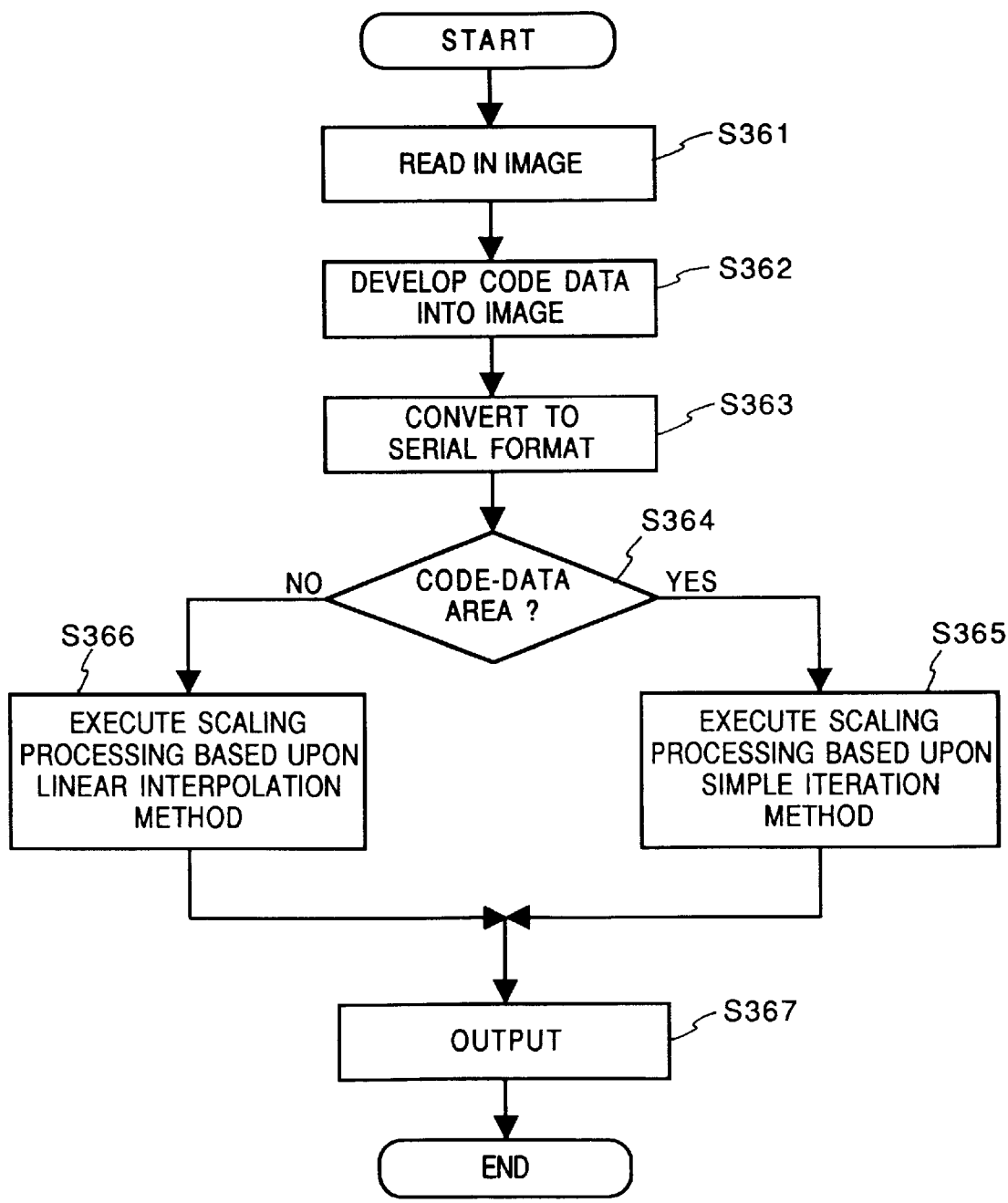
FIG. 36 is a flowchart illustrating a procedure executed by the apparatus of FIG. 33 according to another embodiment.

The fourth embodiment can be realized by the apparatus of FIG. 33 in the same manner as the third embodiment. FIG. 36 is a flowchart illustrating the procedure for this purpose. It is assumed that data of a format in which code data of a character or the like that has been inserted at a position designated on raster-format image data has already been stored in the image memory 333.

At step S361 of the flowchart, image data in which code data has been written is read in from the image memory 333 in a serial format. Among the data read in, an image corresponding to the code data is created based upon the code data and this image is imbedded at a position designated in the image data at step S362. At this time, the position of the imbedded character is stored in the memory 332. The raster-format image data created at step S362 is converted into the serial format at step S363. The details of processing at this step are the same as those of step S352 in FIG. 35. Though scaling processing is performed next, whether or not a pixel undergoing processing falls within limits in which a character is preset is discriminated at step S364. To accomplish this, the raster to which the pixel currently undergoing processing corresponds in the raster format is calculated or stored in memory beforehand, and a comparison is performed to determine whether this raster is the same as the raster of the character stored at step S362.

If the raster is thus found to be one having a character, scaling processing based upon the simple iterative method is performed at step S365. If the raster is found not to have a character, then scaling processing based upon linear interpolation is performed at step S366. Image data for which scaling processing has been completed is outputted from the serial printer 335 at step S367.

Thus, by changing the method of scaling processing in dependence upon the content of the image data in the manner set forth above, a more distinct image can be obtain.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing comprising:
   scaling means for applying scaling processing to serial-format image data, to produce scaled serial-format image data;
   converting means for converting the scaled serial-format image data into raster-format image data; and
   storing means for storing the raster-format image data,
   wherein said scaling means uses a method of linear interpolation.

2. The apparatus according to claim 1, further comprising input means for inputting the serial-format image data.

3. An image processing apparatus comprising:
   storing means for storing raster-format image data;
   converting means for converting the raster-format image data into serial-format image data; and
   scaling means for applying scaling processing to the serial-format image data,
   wherein said scaling means uses a method of lienar interpolation.

4. The apparatus according to claim 3, further comprising output means for outputting the serial-format image data.

5. The apparatus according to claim 4, wherein said output means is an ink-jet printer.

6. An image processing apparatus comprising:
   input means for inputting serial-format image data;
   first scaling means for applying scaling processing to the serial-format image data inputted by said input means to produce scaled serial-format image data;
   first converting means for converting the scaled serial-format image data into raster-format image data;
   storing means for storing the raster-format iamge data;
   second converting means for converting the raster-format image data into serial-format image data; and
   second scaling means for applying scaling processing to the serial-format image data obtained as an output from said second converting means.

7. The apparatus according to claim 6, wherein said serial-format image data is suitable for shuttle scanning.

8. An image processing apparatus for processing image data accompanied by code data, comprising:
   synthesizing means for generating a character image that corresponds to the code data and combining the character image with raster image data;
   converting means for converting the raster image data into serial-format image data; and
   scaling means for applying scaling processing to the serial-format image data.

9. The apparatus according to claim 8, wherein said synthesizing means selects a size for the character image in such a manner that the character image will take on a predetermined size after the scaling processing.

10. The apparatus according to claim 8, wherein said scaling means scales the character image by a simple iterative method and scales portions other than the character image by a method of linear interpolation.

11. An image processing apparatus comprising:
    an adding processor for combining image data with first-format image data in which an order of pixel data in the combined image data is suitable for shuttle-scanning;
    scaling means for applying scaling processing to the first-format image data;
    converting means for converting the first-format image data into second-format image data in which order of pixel data is suitable for raster scanning; and
    storing means for storing the second-format image data,
    wherein said scaling means uses a method of linear interpolation.

12. The apparatus according to claim 11, further comprising input means for inputting the first-format image data.

13. An image processing method for processing image data accompanied by code data, comprising:
    a synthesizing step of generating a character image that corresponds to the code data and combining the character image with raster image data;
    a converting step of converting the raster image data into serial-format image data; and
    a scaling step of applying scaling processing to the serial-format image data.

14. The apparatus according to claim 13, wherein said serial-format image data is suitable for shuttle scanning.

15. An image processing method comprising:
    a combining step of combining image data with first-format image data in which order of pixel data in the combined image data is suitable for shuttle-scanning;
    a scaling step of applying scaling processing to the first-format image data;
    a converting step of converting the first-format image data into second-format image data in which order of pixel data is suitable for raster scanning; and
    a storing step of storing the second-format image data,
    wherein a method of linear interpolation is used in said scaling step.

16. The method according to claim 15, further comprising an input step of inputting the first-format image data.

17. An image processing apparatus for processing raster image data accompanied by code data, comprising:
    synthesizing means for generating a character image that corresponds to the code data and combining the character image with raster image data;
    converting means for converting the raster image data obtained by said synthesizing means into serial-format image data;
    scaling means for scaling the image data, which has been converted into the serial-format image data by said converting means, in such a manner that the character image is scaled by a simple iterative method while other portions are scaled by a method of linear interpolation; and
    serial output means for printing out the image data scaled by said scaling means.

18. The apparatus according to claim 17, wherein said output means is an ink-jet printer.

19. The apparatus according to claim 18, wherein said scaling means uses a method of linear interpolation.

20. An image processing apparatus comprising:
    an adding processor for combining image data with first-format image data in which order of pixel data in the combined image data is suitable for shuttle-scanning;
    scaling means for applying scaling processing to the first-format image data;
    converting means for converting the first-format image data into second-format image data in which order of pixel data is suitable for raster scanning; and storing means for storing the second-format image data, wherein a main scanning direction of the shuttle scanning falls at right angles with a main scanning direction of the raster-scanning and an image is composed by performing the shuttle scanning repeatedly.

21. The apparatus according to claim 20, further comprising input means for inputting the first-format image data.

22. The apparatus according to claim 21, wherein said input means inputs the first format image data by performing shuttle scanning, and wherein the shuttle scanning and the scaling-processing are performed concurrently.

23. An image processing apparatus comprising:

storing means for storing first-format image data in which an order of pixel data is suitable for raster scanning;

converting means for converting the first-format image data into second-format image data in which the order of pixel data is suitable for shuttle scanning; and scaling means for applying scaling processing to the second-format image data.

24. The apparatus according to claim 23, wherein said scaling means uses a method of linear interpolation.

25. The apparatus according to claim 23, further comprising output means for outputting the second-format image data.

26. The apparatus according to claim 25, wherein said output means is an ink-jet printer.

27. An image processing method comprising the steps of:

storing first-format image data in which order of pixel data is suitable for raster scanning;

combining image data with the first-format image data;

converting the first-format image data into second-format image data in which the order of pixel data is suitable for shuttle scanning; and scaling the second-format image data, wherein a method of linear interpolation is used in said scaling step.

28. The method according to claim 27, further comprising an output step of outputting the second-format image data.

29. The method according to claim 28, wherein the second-format image data is outputted by an ink-jet printer in said output step.

30. An image processing method comprising:

a combining step of combining image data with first-format image data in which order of pixel data in the combining image data is suitable for shuttle-scanning;

a scaling step of applying scaling processing to the first-format image data; and a converting step of converting the first-format image data into second-format image data in which order of pixel data is suitable for raster scanning, wherein a main scanning direction of the shuttle scanning falls at right angles with a main scanning direction of the raster scanning and an image is composed by performing the shuttle scanning repeatedly.

31. The method according to claim 30, wherein a method of linear interpolation is used in said scaling step.

32. The method according to claim 30, further comprising an input step of inputting the first-format image data.

33. The method according to claim 32, wherein the first format image data is inputted by performing shuttle scanning, and wherein said shuttle scanning and the scaling-processing are performed concurrently.

34. An image processing apparatus comprising:

an adding processor for combining image data with first-format image data;

converting means for converting the first-format image data into second-format image data in which order of pixel data is suitable for shuttle scanning;

scaling means for applying scaling processing to the second-format image data, wherein a main scanning direction of the shuttle scanning falls at right angles with a main scanning direction of the raster scanning and image is composed by performing the shuttle scanning repeatedly.

35. The apparatus according to claim 34, wherein said scaling means uses a method of linear interpolation.

36. The apparatus according to claim 34, further comprising output means for outputting the second-format image data.

37. The apparatus according to claim 36, wherein said output means comprises an ink-jet printer.

38. An image processing method comprising the steps of:

combining image data with first-format image data;

converting the first-format image data into second-format image data in which order of pixel data is suitable for shuttle scanning; and scaling the second-format image data, wherein a main scanning direction of the raster scanning falls at right angles with a main scanning direction of the shuttle scanning and an image is composed by performing the shuttle scanning repeatedly.

39. The method according to claim 38, further comprising an output step of outputting the second-format image data.

40. The method according to claim 38, wherein a method of linear interpolation is used in said scaling step.

41. An image processing apparatus comprising:

an adding processor for combining image data with serial-format image data;

a scaling unit, which includes AND gates, OR gates, latches and multipliers, for applying scaling processing to serial-format image data, to produce scaled serial-format image data;

a converting unit, which includes counters, multiplexers and memory, for converting the scaled serial-format image data into raster-format image data; and a memory device for storing the raster-format image data, wherein said scaling unit uses a method of linear interpolation.

42. The apparatus according to claim 41, further comprising an image scanner for inputting the serial-format image data.

43. An image processing apparatus comprising:

a memory device for storing raster-format image data;

an adding processor for combining image data with raster-format image data;

a converting unit, which includes counters, multiplexers and memory, for converting the raster-format image data into serial-format image data; and a scaling unit, which includes AND gates, OR gates, latches and multipliers, for applying scaling processing to the serial-format image data, wherein said scaling unit uses a method of linear interpolation.

44. The apparatus according to claim 43, further comprising a printing unit, which includes a printing head and motors, for printing out the serial-format image data scaled by said scaling unit.

45. The apparatus according to claim 44, wherein said printing unit includes an ink-jet head as the printing head.

46. An image processing apparatus comprising:

an adding processor for combining image data with first-format image data, in which order of pixel data in the combined image data is suitable for shuttle-scanning;

a scaling unit, which includes AND gates, OR gates, latches and multipliers, for applying scaling processing to the first-format image data;

a converting unit, which includes counters, multiplexers and memory, for converting the first-format image data into second-format image data in which order of pixel data is suitable for raster scanning; and a memory device for storing the second-format image data, wherein a main scanning direction of the shuttle scanning falls at right angles with a main scanning direction of the raster-scanning and an image is composed by performing the shuttle scanning repeatedly.

47. The apparatus according to claim 46, further comprising an image scanner for inputting the raster-format image data.

48. An image processing apparatus comprising:

a memory device for storing first-format image data in which order of pixel data is suitable for raster scanning;

an adding processor for combining image data with the first-format image data;

a converting unit, which includes counters, multiplexers and memory, for converting the first-format image data into second-format image data in which order of pixel data is suitable for shuttle scanning; and a scaling unit, which includes AND gates, OR gates, latches and multipliers, for applying scaling processing to the second-format image data.

49. The apparatus according to claim 48, further comprising a printing unit, which includes a printing head and motors, for printing out the serial-format image data scaled by said scaling unit.

50. The apparatus according to claim 48, wherein said scaling means uses a method of linear interpolation.

51. The apparatus according to claim 50, wherein said printing unit includes an ink-jet head as the printing head.

52. An image processing apparatus comprising:

an image scanner for inputting serial-format image data;

a first scaling unit, which includes AND gates, OR gates, latches and multipliers, for applying scaling processing to the serial-format image data inputted by said input means to produce scaled serial-format image data;

a first converting unit which includes counters, multiplexers and memory, for converting the scaled serial-format image data into raster-format image data;

storing means for storing the raster-format image data;

an adding processor for combining image data with the raster-format image data;

a second converting unit, which includes counters, multiplexers and memory, for converting the raster-format image data into serial-format image data; and a second scaling unit, which includes AND gates, OR gates, latches and multipliers, for applying scaling processing to the serial-format image data obtained as an output from said second converting means.

53. An image processing apparatus for processing image data accompanied by code data, comprising:

a synthesizing unit, which includes AND gates, OR gates and character generator ROM, for generating a character image that corresponds to the code data and combining the character image with raster image data;

a converting unit, which includes counters, multiplexers and memory, for converting the raster image data into serial-format image data; and a scaling unit, which includes AND gates, OR gates, latches and multipliers, for applying scaling processing to the serial-format image data.

54. The apparatus according to claim 53, wherein said synthesizing unit selects a size for the character image in such a manner that the character image will take on a predetermined size after the scaling processing.

55. The apparatus according to claim 53, wherein said scaling unit scales the character image by a simple iterative method and scales a portion other than the character image by a method of linear interpolation.

56. An image processing apparatus for processing raster image data accompanied by code data, comprising:

a synthesizing unit, which includes AND gates, OR gates and character generator ROM, for generating a character image that corresponds to the code data and combining the character image with raster image data;

a converting unit, which includes counters, multiplexers and memory, for converting the raster image data obtained by said synthesizing means into serial-format image data;

a scaling unit, which includes AND gates, OR gates, latches and multipliers, for scaling the image data, which has been converted into the serial-format image data by said converting means, in such a manner that the character image is scaled by a simple interactive method while other portions are scaled by a method of linear interpolation; and a printing unit, which includes a printing head and motors, for printing out the serial-format image data scaled by said scaling unit.

57. The apparatus according to claim 56, wherein said printing unit includes an ink-jet head as the printing head.

* * * * *

UNITED STATES PATENT AND TRADEMARK OFFICE
CERTIFICATE OF CORRECTION

PATENT NO. : 6,058,222
DATED : May 2, 2000
INVENTOR(S) : Yasunori Hashimoto

It is certified that error appears in the above-identified patent and that said Letters Patent is hereby corrected as shown below:

Column 6,
Line 29, "hold" should read -- hold. --.

Column 12,
Line 55, "is" should read -- are --.

Column 13,
Line 28, "00201H, 00201H," should read -- 00101H, 00201H, --.

Column 17,
Line 45, "28003," should read -- 2803, --.

Column 18,
Line 17, "in" (first occurrence) should read -- is --.

Column 20,
Line 61, "obtain." should read -- obtained. --.

UNITED STATES PATENT AND TRADEMARK OFFICE
CERTIFICATE OF CORRECTION

PATENT NO. : 6,058,222
DATED : May 2, 2000
INVENTOR(S) : Yasunori Hashimoto

It is certified that error appears in the above-identified patent and that said Letters Patent is hereby corrected as shown below:

Column 21,
Line 24, "lienar" should read -- linear --.

Signed and Sealed this

Second Day of October, 2001

Attest:

*Attesting Officer*

NICHOLAS P. GODICI
*Acting Director of the United States Patent and Trademark Office*